US008082135B2

(12) United States Patent
Ascenzi

(10) Patent No.: US 8,082,135 B2
(45) Date of Patent: Dec. 20, 2011

(54) METHOD AND SYSTEM FOR MODELING BONE STRUCTURE

(75) Inventor: Maria-Grazia Ascenzi, Los Angeles, CA (US)

(73) Assignee: The Regents of the University of California, Oakland, CA (US)

(*) Notice: Subject to any disclaimer, the term of this patent is extended or adjusted under 35 U.S.C. 154(b) by 418 days.

(21) Appl. No.: 11/917,281

(22) PCT Filed: Jun. 13, 2006

(86) PCT No.: PCT/US2006/023041
§ 371 (c)(1),
(2), (4) Date: Dec. 12, 2007

(87) PCT Pub. No.: WO2006/135901
PCT Pub. Date: Dec. 21, 2006

(65) Prior Publication Data
US 2008/0208550 A1 Aug. 28, 2008

Related U.S. Application Data

(60) Provisional application No. 60/690,354, filed on Jun. 13, 2005, provisional application No. 60/708,724, filed on Aug. 15, 2005.

(51) Int. Cl.
G06F 9/455 (2006.01)

(52) U.S. Cl. ........................................................ 703/11

(58) Field of Classification Search ................ 703/2, 11; 424/423, 426; 8/94.11; 73/788, 378; 623/23.61
See application file for complete search history.

(56) References Cited

U.S. PATENT DOCUMENTS

| 7,124,067 | B2* | 10/2006 | Ascenzi | 703/11 |
|---|---|---|---|---|
| 7,127,383 | B2* | 10/2006 | Ascenzi et al. | 703/11 |
| 7,212,958 | B2* | 5/2007 | Ascenzi et | 703/11 |
| 7,283,940 | B2* | 10/2007 | Ascenzi et al. | 703/2 |
| 7,353,153 | B2* | 4/2008 | Ascenzi et al. | 703/11 |
| 2002/0082779 | A1 | 6/2002 | Ascenzi et al. | |
| 2002/0155162 | A1 | 10/2002 | Ascenzi et al. | |
| 2003/0216899 | A1* | 11/2003 | Ascenzi et al. | 703/11 |
| 2003/0217415 | A1* | 11/2003 | Crouch et al. | 8/94.11 |
| 2004/0052730 | A1 | 3/2004 | Hochman | |
| 2004/0062786 | A1* | 4/2004 | Ascenzi et al. | 424/423 |
| 2005/0131662 | A1* | 6/2005 | Ascenzi et al. | 703/11 |
| 2005/0196425 | A1* | 9/2005 | Zamora et al. | 424/426 |
| 2005/0246035 | A1* | 11/2005 | Wolfinbarger et al. | 623/23.61 |

(Continued)

OTHER PUBLICATIONS

Wikipedia, "Collagen", Sep. 9, 2010.*

(Continued)

Primary Examiner — Kandasamy Thangavelu
(74) Attorney, Agent, or Firm — Kilpatrick Townsend & Stockton LLP

(57) ABSTRACT

The present invention relates to scanning confocal microscopy used to systematically quantify characteristic collagen fibril orientations by position within the lamellar thickness of secondary osteons along the osteon radial direction. Fully calcified lamellar specimens appear either extinct or bright in cross-section under circularly polarized light, and can be isolated from embedded osteon, flattened, and examined along the radial thickness direction of the original embedded osteon. Collagen orientation is measured from confocal image stacks. Extinct and bright lamellae display distinct patterns of collagen orientation distribution. Relative counts of collagen fibrils that are longitudinal to the osteon axis in extinct lamellae, transverse to the osteon axis in bright lamellae, and oblique to the osteon axis in both lamellar types, show parabolic distribution through the osteon radial direction.

19 Claims, 19 Drawing Sheets

U.S. PATENT DOCUMENTS

2006/0075826 A1* 4/2006 Roberts et al. .............. 73/788
2008/0208550 A1* 8/2008 Ascenzi .................. 703/11

OTHER PUBLICATIONS

Takano et al., "Elastic anisotropy and collagen orientation of osteonal bone are dependent on the mechanical strain distribution", Jouranl of orthopedic research, 1999.*

Reilly et al., "Investigation of the morphology of the lacunocanalicular system of cortical bone using atomic force microscopy", Annals of Biomedical Engineering, 2001.*

Puustjarvi et al., "Do more hioghly organized collagen fibrils increase bone mechanical strength in loss of mineral density after one year running training", Jouranl of bone and mineral research, 1999.*

Akiva, et al., "Modeling the three-dimensional elastic constants of parallel-fib red and lamellar bone", J. Mater Sci. 1998, 33, pp. 1497-1509.

Aoubiza, et al., "On the mechanical characterization of compact bone structure using homogenization theory", J. Biomech, 1996, 29, 1539-1547.

Ascenzi, et al., "Evidence of a state of initial stress in osteonic lamellae", J. Biomech. 1997, 10, 447-453.

Ascenzi, et al., "Pinching in longitudinal and alternate osteons during cyclic loading", J. Biomech, 1997, 30, 689-695.

Ascenzi, et al, "The ultimate tensile strength of single osteons", Acta Anat., 1964, 58, 160-183.

Ascenzi, et al., "The shearing properties of single osteons", Anat. Rec., (1972) 172, 499-510.

Ascenzi, et al., "Structural differences between "dark" and "bright" isolated human osteonic lamellae" J. Struct. Biol, 141: 22-33, (2003) doi: 10.1016/S1047-8477(02)00578-6.

Bell, G. H. "Bone as a mechanical engineering problem", In: the Biochemestry and Physiology of Bone (Bourne G. H. ed) Academic Press, (1956) New York.

Billinton, et al., "Seeing the wood through the trees: a review of techniques for distinguishing GFP from endogenous autofluorescence", An. Biochem, 2001, 291, 175-197.

Birkenhager-Frenkel, et al. "Age related changes in cancellous bone structure. A two-dimensional study in the transiliac and iliac crest biopsy sites", Bone Miner, 1988, 4, 197-216.

Carter, et al., "Fatigue Behavior of Adult Cortical Bone: The Influence of Mean Strain and Strain Range", Acta orthop, scand. 1981, 52, 481-490.

Carter, et al., "Compact bone fatigue damage—I. Residual strength and stiffness", J. Biomech, 1977, 10, 325-337.

Carter, et al., "Fatigue life of compact bone—I. Effects of stress amplitude, temperature and density", J. Biomech, 1976, 9, 27-34.

Carter, et al., (1976) "Fatigue life of compact bone—II Effects of microstructure and density", J. Biomech., 9, 211-218.

Frasca, et al., "Collagen fiber orientation in human secondary osteons", Acta Anat., 1977, 98, 1-13.

Giraud-Guille, et al., "Liquid crystalline assemblies of collagen in bone and in vitro systems", J. Biomech., 2003, 36, 1571-1579.

Hayes, et al., "Biomechanics of Bone" In: Skeletal Research: An Experimental Approach (D. Simmons and A. Kunin, eds.), Academic Press Inc., (1979) New York, 1, 263-299.

Hodge, et al., "Recent studies with the electron microscope on ordered aggregates of the tropocollagen macromolecules", in: Ramachandran G.N. (Ed.), Aspects of Protein Structure, Academic Press, 1963, London, pp. 289-300.

Hogan, H.A, "Micromechanics modeling of Haversian cortical bone properties", J. Biomech., 1992, 25, 549-556.

Kotha, et al., "Modeling the tensile mechanical behavior of bone along the longitudinal direction", J Theor Biol., 2002, 219, 269-79.

Petersen, H., "Die Organe des Skeletsystems", in: Mollengorff (v.), W. (Ed.) Handbuch der mikroskopischen Anatomie des Menschen, Springer, Berlin, 1930, vol. 2, Part 2, pp. 521-678 (submitted in two parts (part 1 521-605) (part 2 606-678)).

Prentice, A.I.D., "Autofluorescence of bone tissues", J. Clin. Path., 1967, 20, 717-719.

Raspanti, et al., "Collagen fibril patterns in compact bone: preliminary ultrastructural observations", Acta Anat., 1996, 155, 249-256.

Reilly, G. C., "Observation of microdamage around osteocyte lacunae in bone" J. Biomech., 2000, 33, 1131-1134.

Rouillier, et al., "La structure lamellaire de l'osteone", Acta Anat., 1952, 14, 9-22.

Ruth, E. B., "Bone studies, I. Fibrillar structure of adult human bone", Amer. J. Anat., 1947, 80, 35-53.

Rybicki, et al., "On the mathematical analysis of stress in the human femur", J. Biomech., 1972, 5, 203-215.

Smith, J. W., "The arrangement of collagen bundles in human secondary osteons", J. Bone Jt. Surg., 1960, 42B, 588-605.

Taylor, et al., "Birefringence of protein solutions and biological systems. II. Studies on TMV, tropocollagen, and paramyosin", Biophys J., 1963, 3, 143-54.

Vincent, J., "Correlation entre la microradiographie et l'image en lumiere polarisee de l'os secondaire", Exp. Cell. Res., 1957, 12, 422-424.

Zysset, et al., "Elastic modulus and hardness of cortical and trabecular bone lamellae measured by nanoindentation in the human femur", J. Biomech., (1999) 32, 1005-1012.

* cited by examiner

Lamellar Thickness - Radial Orientation
a - Extinct     b - Bright

METHOD AND SYSTEM FOR MODELING BONE STRUCTURE

CROSS-REFERENCES TO RELATED APPLICATIONS

This application is a U.S. national phase application under 35 U.S.C. §371 of International Patent Application No. PCT/US2006/023041 filed Jun. 13, 2006, which claims the benefit of priority to U.S. Provisional Patent Application No. 60/690,354 filed Jun. 13, 2005, and U.S. Provisional Patent Application No. 60/708,724 filed Aug. 15, 2005, the disclosures of all of which are hereby incorporated by reference in their entireties. The International Application was published in English on Dec. 21, 2006 as WO 2006/135901.

FIELD OF THE INVENTION

The present invention relates to the quantified distribution of collagen orientation throughout osteon radial orientation and its role in lamellar models and modeling methods for human bone. This invention also relates to methods that combine a micro-dissection technique with confocal microscopy, and for the first time allow quantification of collagen orientations according to the level of depth of collagen within the lamellar thickness. The results generated by these methods may be used in the modeling of human bone osteons, collagen orientation, and lacunae and canaliculae, thereby bringing bone modeling closer to biological reality. Because these results refer to a biological material with a composite microstructure, they are broadly relevant and applicable to the implementation of new composite materials.

Such quantified distribution may be used in accordance with the present invention to prepare and use databases and software programs that can be adjusted to allow for construction of osteon models that reflect biological variability. The present invention can also be used in models and modeling methods for human bone based on bone's hierarchical structure and on its hierarchical mechanical behavior. The model allows for the assessment of bone deformations and the computation and prediction of strains and stresses due to the specific forces acting on bone during function. The model may be computerized, for example using computer simulation, imaging and rendering techniques.

BACKGROUND OF THE INVENTION

Material science defines the structural properties of an object as the properties that describe the object's makeup independent from its shape. The structural properties of adult human bone are complex and can be modeled as a four-order hierarchy, arranged in decreasing size (Petersen, 1930). The first order, macrostructure, comprises the structures corresponding to gross shape and differentiation between compact (or cortical) bone and spongy (cancellous or trabecular) bone. Compact bone is present in the long bone shaft (or diaphysis). Spongy bone is present in the lower jaw (mandible), in the epiphysis of long bone shaft, and in flat and short bones. The second order (or microstructure) includes lamellar systems (lamellae) and related structures such as bone marrow (see, e.g., Bloom and Fawcetts, 1986). In compact bone, organized lamellae around vascular (harvesian) canals are referred to as secondary osteons (harvesian systems), and portions of osteons among whole osteons are referred to as the interstitial bone. For cancellous bone, the second order consists of lamellar systems that form trabeculae. The third order (or ultrastructure) of both compact and cancellous bone consists of the organic phase (mainly of type 1 collagen) and the inorganic phase (carbonated apatite crystallites); mucopolysaccarides amount to a small amount but may have a significant role. The apatite crystallites are oriented locally along the collagen fibril orientation. The fourth order of compact bone consists of molecular arrangements between organic and inorganic substances.

At the microstructural level, the osteon comprises a haversian canal with coaxially arranged lamellae. Osteons measure a few centimeters in length, and between 150 and 300 μm in diameter. The osteon axis is generally oriented along the axis of the long bone to which it belongs. The degree of osteon calcification (relative amount of apatite crystallites) is variable from osteon to osteon as well as within osteons. These differences are proposed to be due to the continuous process of bone renewal, or remodeling, that osteons undergo. Consequently, osteons at different degrees of calcification are always present in adult compact bone.

Two lamellar types exist: the one that appears essentially extinct and the one that appear bright under circularly polarized light. Extinct lamellae consist of collagen fibrils with a marked longitudinal spiral course. Bright lamellae consist of collagen fibrils with a marked oblique and transversal course in successive lamellae (Frasca et al., 1977, Giraud-Guille, 1988, Ascenzi M.-G. et al., 2003). The arrangement of lamellae within the osteon produces a spectrum of osteon types by their appearance under circularly polarized light.

The trabeculae of cancellous bone are osseous structures with either a sheet-like or a rod-like configuration. These structures interlace to form a lattice-like or spongy biological structure. For example, both types of trabeculae are present in the calcaneous; however, up to 3% of the rod-like configurations are tubular due to the vascular canal running through them. Therefore, they are similar to the harvesian system. In general, tubular trabeculae appear to have a relatively simple structure. Collagen fibrils run mostly parallel to the long axis of tubular trabeculae in the trabeculae outer portion and perpendicular in the inner portion.

Compact bone consists of about 40% minerals, 40% collagen, and 20% fluids. The major internal spaces or discontinuities of compact bone include the vascular system, pits and cavities (lacunae), narrow channels (canaliculae), fine porosity, and spaces between the mineral phases. The major internal material discontinuities of compact bone, in order of decreasing size, are:

| | |
|---|---|
| Vascular system | 20-50 μm |
| Lacunae | 4-6 μm |
| Canaliculae | 0.5-2 μm |
| Fine porosity | 600-800 Å |
| Spaces between mineral phases | 50-100 Å |

Although the true density of fully calcified cancellous bone is a little lower and the proteoglycan content a little greater than those of the fully calcified compact bone, the substantial difference between compact and cancellous bone resides in the porosity. The cancellous bone porosity, which ranges from 30% to more than 90%, is mainly due to the wide vascular and bone marrow intrabecular spaces. As is seen in compact bone, levels of calcification vary from trabecula to trabecula and within trabeculae.

The connections and orientations of trabeculae are found to have precise patterns, which are believed to relate to specific mechanical properties. The structure of the cancellous bone in the head and in the neck of the femur is usually given as an example of the correlation between the orientation of the trabeculae and the linear distribution of the principal forces during load bearing (stress trajectoral theory (Bell, 1956)). In general, such correlation between the orientation of the trabeculae and the linear distribution of the principal forces during load bearing is still under study because while in line with the mathematical calculations, the possible effect of muscle traction is complex (Koch, 1917; Rybicki et al., 1972). Nevertheless, there is a close relationship between the number and arrangement of trabeculae and the strength of cancellous bone (see, e.g., Kleerekoper et al., 1985). This is evidenced by the age-induced loss of trabeculae (see, e.g., Birkenhäger-Frenkel et al., 1988). Since this loss is rather selective (i.e. transverse trabeculae disappear more frequently than vertical ones in the central zone of the osteoporotic vertebral body; entire trabeculae totally disappear in elderly women; sharp fall in trabecular number is seen in elderly men), it is possible that cancellous bone contains some bundles of trabeculae whose main function is to resist mechanical forces while others have mainly a metabolic role.

The mechanical behavior of a material, or the response of the material to forces, depends on the structure of the material. If the material consists of a hierarchical structure, the mechanical behavior of the material depends on the contributions of the hierarchical levels. Each level or order of the hierarchy responds to the forces according to the substructures within that order and relationships with the orders of which it is a sublevel. Further, patterns of lower hierarchical levels at higher hierarchical levels may play a relevant role in the mechanical properties of the higher level. Therefore, the mechanical properties of a material will depend on the hierarchical level of the material. Bone is an example of a material where the mechanical behavior and mechanical properties are dependent upon this kind of multilevel structure.

Mechanical properties of bone have been and are being investigated at various hierarchical levels through invasive (specimen isolation) and non-invasive testing. Osteonic lamellae, osteons, trabeculae, and macroscopic compact and cancellous bone samples have been and are the objects of such studies. Micromechanical results include Ascenzi A. and Bonucci, 1964, 1967; Ascenzi A. and Bonucci, 1968, 1972; Currey, 1969; Ascenzi A. et al., 1985, 1997, 1998; Hohling et al., 1990; Ascenzi A. et al., 1990, 1994; Marotti et al., 1994; Ziv et al., 1996; Ascenzi M.-G., 1999, 1999a; Huja et al., 1999; Zysset et al., 1999; Ascenzi M.-G. et al., 2000. Macromechanical results include Hazama, 1956; Cook and Gordon, 1964; Carter and Hayes, 1976 and 1977; Carter et al., 1976 and 1981; Carter and Spengler, 1978; Hayes and Carter, 1979; Burr et al., 1988; Cater and Carter 1989; Jepsen and Davy, 1997.

Many investigators have devoted their research to model the structure of secondary osteons either in the context of the macrostructure (see, e.g., Katz, 1981; Hogan, 1992; Aoubiza et al., 1996) or as a self-contained structure (Akiva et al., 1998; Ascenzi M.-G., 1999, Weiner et al., 1999, Jäger and Fratzl, 2000, Kothawz and Guzelsu, 2002; Gotha and Guzelsu, 2002; and Ascenzi M.-G. et al., 2003 and 2004). The work of these investigators includes development of mechanical theories and application of finite element and analytical methods based on and verified by experiments, as discussed in more detail below.

Following Leeuwenhoek's early observations (1693), the lamellar structure of secondary osteons in human bone has remained the subject of numerous investigations. While researchers over the centuries have agreed on the existence of two lamellar types, different hypotheses as to the structural characteristics that differentiate one type from the other were presented. The debate focused principally on the organization of collagen fibrils and carbonated apatite crystallites, the main elementary components of secondary osteons.

The differences of opinion were sustained by the challenges: (1) to optimize microscopy technique and specimen preparation for structural visualization of lamellae whose thickness ranges between a mere 2 and 16 microns and whose shape is curved; (2) to interpret the microscopy observation of structure in terms of orientation and density of collagen and apatite; and (3) to extrapolate the 3-dimensional biological reality of macroscopic bone from the 2-dimensional information provided by the microscopy plane of focus on specimens excised from macroscopic bone at specific orientations and observed at specific angles.

To confront these challenges, investigators employed increasingly sophisticated microscopy tools with higher magnifications and resolutions as they became available. These tools have enabled acquisition of knowledge about the lamellar structure and provided the foundation for further refined structural hypotheses. Further, the development of materials science and engineering theories over time has allowed more robust testing and assessment of the hypotheses formulated by the various investigators. In recent decades, increasing computer capability and software sophistication have allowed simulation of mechanical testing of lamellae and osteons to include greater structural detail so as to explain function with higher accuracy.

The following is a review of early compound microscopy investigations of lamellar structure, modern microscopy investigations, and previous lamellar modeling to provide context for the present invention.

The earliest microscope of the 1590's was merely a tube with a plate for the object at one end, and at the other, a lens which yielded a magnification of less than ten times actual size. Leeuwenhoek devised techniques to grind and polish small lenses of great curvature that afforded his microscopes unprecedented 270× magnification. His examination of bone revealed osteons and their lamellae (Leeuwenhoek, 1693). Microscopes of the time used light to illuminate the bone specimen, and their magnifications were not bettered by more than an order of magnitude until the twentieth century. The limitation on magnification was the wavelength of light. With white light, any two details closer than 0.275 micrometers are seen as a single detail by an ordinary light microscope, and any detail with a diameter smaller than 0.275 micrometers will be either invisible or blurry. Over time, the magnification available by compound microscopes became only approximately an order of magnitude higher, up to 1800× with ordinary light and up to 5000× with blue light.

Kölliker (1854), by regular light microscopy with magnifications up to 350×, perceived "lamellated" bone matrix with two layers in each lamella: one layer as pale and more homogeneous; a second layer as darker, granular and for the most part striated. He hypothesized that differences in elementary component densities might explain the difference in appearance. Ebner (1875) was one of the first researchers to employ polarization of light in a compound microscope for lamellar investigations. When light is forced to travel as a plane wave through a bone specimen placed between a so-called polarizer and a so-called analyzer, the image seen through the eye pieces of the microscope consists of either extinct or bright signals depending on whether the light passes through the specimen substructures. That the concentric lamellae of an osteon in cross-section gives rise to either an extinct or bright polarized light signal points to a difference in the structure of the underlying lamellae. However, the significance of the signal requires interpretation because the extinct or bright signal per se does not yield information about the structural differences that determine its appearance. By means of a magnification up to 600× under polarized light, Ebner interpreted the appearance of "lamellation" as due to orientation of "connective fibers". He hypothesized that the "connective fibers" were a component of bone tissue, separate from calcium salts that would lie in the spaces between the fibers.

Ranvier (1887) followed Kölliker's terminology of differentiation between homogeneous lamella and streaked lamella. At a magnification up to 600× under polarized light, he associated an extinct appearance to the streaked lamella and a bright appearance to the homogeneous lamella. He hypothesized that the different extinct or bright appearance is due to a difference of fiber orientation. Because fibers viewed transversely to their axis appear extinct, the homogenous lamella would appear extinct on a section transverse to the osteon axis by virtue of its fibers being viewed transversely to their axis. Because fibers viewed along their length appear bright, the streaked lamella would appear bright on a section transverse to the osteon axis by virtue of its fibers being viewed along their axis. This association of the polarization signal with fiber orientation was at that time a non-verified hypothesis derived through reasoning on the physics of the polarized light microscopy. Gebhardt (1906) also interpreted the differences in lamellar types, viewed through regular and polarized light microscopy, in terms of orientation of higher percentage components. More specifically he proposed what in modern terminology is defined as an orthogonal or quasi-orthogonal plywood osteonic model, where collagen fibrils change orientation from a lamella to the next one. Ziegler (1906) instead interpreted the different appearance of lamellae under polarized light as resulting from a difference in density associated with fibrillar lamellae separated by what he defined as interstitial substance, without fibrillae extending from a lamella to the next.

Weidenreich (1930) conducted his regular light microscopy investigations with up to 1040× magnification and supported Gebhardt's interpretation of difference as due to orientation of elementary components. Ruth (1947), through regular light microscopy of up to 1800× magnification differentiated between compact and diffuse lamellae in accordance with their structural appearance. He saw "compact lamellae" as bands of circumferentially oriented compact, felted or interwoven bundles of fibrillae, and "diffuse lamellae" as bands of radially oriented fibrillae, loosely disposed, and separated from each other by relatively wide interfibrillar spaces filled with a granular substance. The fibrillae themselves were observed as delicate strands disposed at right angles to the compact lamellae.

Amprino (1946) and Amprino and Engström (1952) addressed the issue of developing a technique to investigate carbonated apatite density. They developed a high-resolution micro-X-ray that showed variation of degree of calcification among secondary osteons. Engström and Engfeldt (1953) showed that X-ray absorption varies in lamellae. They hypothesized existence of lamellae with a high content of organic and inorganic material alternating with lamellae containing less substance.

The application in the 1950's of transmission electron microscopy to secondary osteons, some twenty years following its invention, offered a new level of insight. In this kind of microscope, electrons are accelerated in a vacuum until their wavelength is extremely short, only one hundred-thousandth that of white light. Beams of these fast-moving electrons are focused on a specimen and are absorbed or scattered by the specimen so as to form an image on an electron-sensitive viewing screen. Electron microscopy allows magnification of objects up to 1 million times and a resolution up to 10 Å. Because initially the tools to cut ultra-thin bone sections suitable for transmission electron microscopy were not available, resin was employed to prepare a surface replica of the bone specimen. The replica, instead of the bone, was then observed with the electron microscope. The scanning electron microscope, which differs from the transmission electron microscope in that it detects secondary electrons emitted from the specimen surface after excitation by a primary electron beam instead of detecting electrons that pass through the specimen, was invented later and employed on bone, as discussed below, starting in the 1980s.

Rouiller et al. (1952) using regular light microscopy, polarized light and transmission electron microscopy, further substantiated Ruth's hypotheses. Frank (Frank et al., 1955; Frank, 1957) observed a variety of fibrillar orientation on osteon specimens cut at various orientations with respect to the Haversian canal by transmission electron microscopy. Vincent (1957) supported the density hypothesis by means of micro-X-ray and polarized light microscopy. Smith (1960) supported the orientation hypothesis and started a classification of osteon types based on micro-X-ray and electron microscopy observations.

Starting in the 1960's, Ascenzi A. and collaborators employed regular and polarized light microscopy as well as micro-X-ray (Ascenzi A. and Bonucci, 1961), electron microscopy (Ascenzi A. et al., 1966), and X-ray synchrotron diffraction (starting with Ascenzi A. et al., 1978) to observe bone micro- and ultra-structures. In particular, they established that the composition of bone specimens of dimensions even as small as 1 mm would vary greatly from specimen to specimen. In their micro-structural investigations they sought to address such variations so as to avoid large standard deviations of experimental data associated with variable, unknown compositions of specimen substructures. To address the composition variability, micro-specimens of specific appearance under polarized light and of fixed degree of calcification needed to be prepared so as to separate the variables and to appreciate their mechanical influence on the properties of bone tissue. Accordingly, Ascenzi A. and collaborators developed techniques for single osteon isolation and single lamellar isolation. They employed isolated single osteons and lamellae to show by mechanical testing that collagen-apatite orientation and degree of calcification are two independent variables (for a review, see Ascenzi M.-G. et al., 2000). To the previously available techniques, synchrotron diffraction added the detection of apatite crystallite orientation patterns and their level of organization through the thickness of isolated single osteons, osteonal hemisections, and isolated single lamellae. Their work (Ascenzi A. and Benvenuti, 1977; Ascenzi M.-G., 1999) extended to the observation of natural stress state differences between lamellar types. The Ascenzi group also found that the lamellar types, not the osteons, are the microstructures that form patterns within macro-structure and are ultimately responsible for giving rise to the combinations most suitable to withstand different stress conditions. Such findings apply to bone tissue under normal and pathological conditions (Ascenzi A., 1988).

Giraud-Guille (1988) established through transmitted electron microscopy the so-called rotated plywood model. A continuous rotation of fiber reinforcement from one layer to the next layer refines Gebhardt's model and explains the ability of the osteon to resist stresses directed along a larger range of orientations. Marotti and Muglia (1988) through scanning electron microscopy point to a difference between more or less loose lamellae in terms of collagen density. The "loose" lamella would contain perhaps a lower collagen density (still on the order of 90% of lamellar volume) and a higher content of non-collagenic protein which would give a more porotic appearance to the bone tissue and a more disordered orientation of collagen fibrils. Reid (1986) used scanning electron microscopy to indicate that lamellae that appear extinct under polarized light on a section transverse to the osteon axis consist of fibrils parallel to the osteon axis while lamellae that appear bright on a section transverse to the osteon axis consist of fibrils perpendicular to the osteon axis.

Structural models of secondary osteons, either in the context of the macrostructure or as a self-contained structure, have been created over time as information about bone structural and mechanical properties became increasingly available in conjunction with the development of engineering theories and increased computer capacity. Such models have addressed a variety of issues, including stress distribution in specimens under specific loading conditions, fracture propagation, and bone remodeling. The mechanical properties of the osteon, simplified to an extreme degree in initial models, were increasingly reflected with greater detail in more accurate models. Such models include development of mechanical theories that describe the microstructural behavior, as well as applications of finite element and analytical methods.

Galileo's observations on long bones of large mammals suggested the need for presence of micro-structures that would enhance the mechanical properties in the longitudinal direction of long bone shaft (Galilei, 1638). In this sense, Katz (1981) and Hogan (1992) viewed osteons as reinforcement to the macrostructure. Aoubiza et al. (1996) provided the first model of osteon groups with mechanical properties that depend on the collagen-apatite orientation within lamellae. Akiva et al. (1998) developed a mathematical model for each lamellar type that subdivides the lamella into volumes where the mineralized phase follows a specific orientation. The models of Weiner et al. (1997, 1999) support the hypothesis that most of the microstructural mechanical properties are built into the lamellar structure. Jäger and Fratzl (2000) proposed a mineralized collagen fibril model with a staggered, instead of parallel, arrangement of the mineral phase to better account for the increase in elastic modulus and fracture stress with increasing mineral content. Kotha and Guzelsu (2002) described through shear-lag theory debonding of matrix from mineral phase due to applied tensile loading in the direction of the apatite crystals. Ascenzi M.-G. (1999) assessed the prestress in isolated single lamellae that appear bright before isolation when still embedded in the surrounding osteons viewed in cross-section. Ascenzi M.-G. et al. (2004) established the methodology to create a virtual osteon from the experimentally observed biological variation of distribution of lamellae, osteocyte lacunae and canaliculae.

Ascenzi M.-G. et al. (2003) established the answer to Leeuwenhoek's query, that specific orientations of collagen fibrils and apatite crystals define and distinguish different human lamellar types. The novel combination of polarized light microscopy, synchrotron diffraction and confocal microscopy, applied to lamellar specimens isolated by a novel micro-dissection technique, evidenced that specific orientations of collagen fibrils and apatite crystals define and distinguish the appearance of lamellae under polarized light microscopy. That is, these combined techniques established that the presence of specific orientations determines whether the concentric lamellae of an osteon transverse section under circularly polarized light appear extinct or bright. As an illustration, FIG. 1a shows a so-called alternate osteon, an osteon in which lamellae appear alternatively extinct and bright in a circularly polarized light image. The micro-dissection technique which Ascenzi M.-G. et al. (2003) applied to alternate osteons allowed isolation of single lamellar specimens viewable by confocal microscopy through the lamellar thickness direction, which corresponds to the radial direction of the embedded osteon prior to the isolation of the specimen.

SUMMARY OF THE INVENTION

The present invention relates to the characteristic orientations of collagen fibrils within lamellar types, and includes measurement of the orientation of collagen in lamellar specimens. The present invention uses the ability of confocal microscopy to distinguish successive planes of focus through the specimen thickness to distinguish fibrillar collagen according to its position within the specimen thickness. The opportunity to examine the flattened isolated lamellae in the specimen thickness orientation on a rotating stage of a circularly polarized light microscope has shown the variation of orientation of collagen fibrils in the thickness direction. The distribution of collagen fibril orientations is evidenced as specific to each lamellar type. Nevertheless, because of the superimposition of sub-structures, the technique does not allow one to assess the orientation distribution as a function of depth within the specimen thickness. Synchrotron diffraction had quantified the total dominant orientations across the lamellar thickness at gridded points and found the dominant orientation different as between the two lamellar types.

Examination of a few specimens by confocal microscopy indicated that such microscopy was suitable to establish and quantify orientation patterns of collagen through the lamellar thickness. Confocal microscopy provides a magnification up to 10,000× and a resolution of 0.10-0.15 µm, falling between what is provided by a compound and an electron microscope. Confocal microscopes attain higher resolution, and consequently magnification, than compound microscopes through the use of a pinhole aperture positioned in front of the photodetector and of a point-by-point illumination technique to prevent out-of-focus light originating from above and below the plane of focus from reaching the photodetector. Confocal microscopy allows distinction of successive planes of focus through the specimen thickness to analyze collagen according to the position of the plane of focus within the specimen thickness.

Orientations of collagen in lamellar specimens with reference to position in the lamellar thickness may be determined in accordance with the present invention. Analysis of these measurements identifies the collagen orientation patterns in three dimensions with reference to what was the radial direction of the original osteon. The methods employed in the context of the present invention, which combine a micro-dissection technique with confocal microscopy, for the first time allow quantification of collagen orientations according to the position of collagen fibrils and the level of depth of collagen within the thickness of the lamella.

Further, because collagen orientation is not randomly distributed in macroscopic bone with respect to the long bone axis, but forms patterns that optimize the tissue function (see e.g. Ascenzi A., 1988), the results of the present investigation allow deduction of material properties of macroscopic bone. In fact, appearance of either extinct or bright signal on macroscopic cross-sections of bone by circularly polarized light can now be associated to specific distributions of orientations' percentages.

In accordance with the present invention, collagen orientation was assessed relative to the axial direction of the embedded osteon. The orientations were measured at each successively deeper scan of the confocal microscope and classified as transverse, oblique acute, longitudinal, or oblique obtuse, parameters defined as sub-ranges of the 180 degrees of potential orientation. The patterns of distribution of the various orientations through the specimen thickness were analyzed. The analysis found the presence of collagen orientation patterns that are specific to each of the two lamellar types.

Extinct lamellae show the presence of longitudinal fibrils which peak in percentage at the middle-third of the thickness and decrease parabolically at the outer thirds. Bright lamellae show the presence of transverse fibrils which peak in percentage at the middle-third of the thickness and decrease parabolically at the outer thirds. The two lamellar types show the presence of characteristic oblique orientations. In each type, the relative counts of oblique orientations display parabolic patterns, which peak at the outer thirds of the lamellar thickness and decrease towards the middle-third. In other words, the oblique fibrils are present at the outer thirds of the lamellar thickness in both lamellar types, while the longitudinal fibrils of extinct lamellae and transverse fibrils of bright lamellae are more numerous at the middle-third of each lamellar thickness. Such an arrangement ensures micro-structural continuity from lamella to lamella through the radial direction of an osteon.

The new micro-anatomical results discovered in the context of the present invention may be used in modeling of human bone osteons which goes beyond prior work in this field aimed at modeling of collagen orientation, lacunae and canaliculae (which are also observed and included in the present invention), thereby bringing the bone modeling of the present invention closer to biological reality. Because the results from the present invention refer to a biological material with a composite micro-structure, they are also broadly relevant to understanding and modeling the structure of natural composites and to the implementation of new composite materials.

One embodiment of the present invention relates to a method of modeling bone structure, comprising:
(a) obtaining an embedded osteon specimen from a subject bone;
(b) recording the radial direction of the osteon specimen;
(c) isolating a lamellar specimen from the osteon specimen by micro-dissection and flattening the lamellar specimen;
(d) examining the lamellar specimen using confocal microscopy;
(e) identifying bright and extinct lamellae and collagen fibrils in the lamellar specimen;
(f) observing and recording the angles of orientation of collagen fibrils relative to the radial direction of the osteon specimen; and
(g) modeling the recorded collagen fibril orientation patterns into a three-dimensional model.

In another embodiment, the subject bone is a bone from a mammal (such as a human), and may be capable of exhibiting autofluorescence. In another embodiment, the osteon specimen is fully calcified.

In another embodiment, the bright and extinct lamellae are observed under circularly polarized light.

In another embodiment, the orientations of collagen fibrils are recorded after observing the collagen fibrils under successive planes of focus through the lamellar thickness.

In another embodiment, the collagen fibrils are identified as corresponding to a group selected from transverse, longitudinal, oblique acute, and oblique obtuse; wherein each group has an angle range relative to the radial direction of the osteon specimen. In a further embodiment, the transverse collagen fibrils have an angle range of 0°-22.5° or 157.5°-180°; the longitudinal collagen fibrils have an angle range of 90°±22.5°; the oblique acute collagen fibrils have an angle range of 45°±22.5° or 135°±22.5°; and the oblique obtuse collagen fibrils have an angle range of 135°±22.5°.

In another embodiment, step (e) in the method of modeling bone structure according to the present invention further comprises observing and recording the orientations of lacunae and canaliculae relative to the radial direction of the osteon specimen.

In another embodiment, the method of modeling bone structure according to the present invention further comprises superimposing a grid having openings that are 10 μm or less (such as 5 μm or less) onto a confocal image of the lamellar specimen. In a further embodiment, the angles of orientation of collagen fibrils are observable at least at 90% of the superimposed grid points.

In another embodiment, the three-dimensional model is created from an osteon database comprising the recorded angles of orientation of collagen fibrils organized into sequences of lists of 3-number sublists. In a further embodiment, the sequences of lists of 3-number sublists correspond to a sequence of surfaces describing the collagen orientation along a continuous subset of xy-planes. In yet a further embodiment, the sequence of surfaces corresponds to a 3-dimensional continuum.

In another embodiment, the three-dimensional model is created from an osteon database comprising the recorded angles of orientation of lacunae and canaliculae organized into sequences of lists of 3-number sublists.

The present invention also relates to an osteon database comprising recorded angles of orientation of collagen fibrils relative to the radial direction of an osteon specimen, and optionally including recorded angles of orientation of lacunae and canaliculae relative to the radial direction of an osteon specimen The present invention also relates to an osteon database comprising recorded angles of orientation of lacunae and canaliculae relative to the radial direction of an osteon specimen.

The present invention further relates to a three-dimensional model of bone structure prepared according to any of the previously described methods of modeling bone structure according to the present invention.

The present invention further relates to a composite bone comprising a material having the orientation patterns of collagen fibrils, or lacunae and canaliculae, that are generated by any of the previously described methods of modeling bone structure according to the present invention.

DETAILED DESCRIPTION OF THE INVENTION

The present invention is next described by means of the following examples. The use of these and other examples anywhere in the specification is illustrative only, and in no way limits the scope and meaning of the invention or of any exemplified form. Likewise, the invention is not limited to any particular preferred embodiments described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

Preparation and Selection of Specimens

Figure 1A:
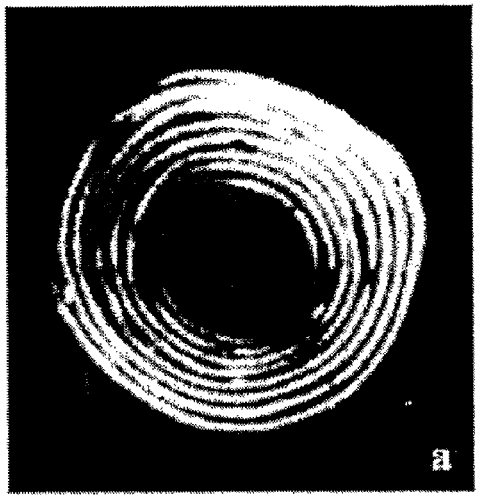
FIG. 1. (a-b) (a) Circularly polarized light shows alternation of "extinct" and "bright" lamellae in alternate osteon; (b) micro-X-ray of femoral mid-shaft transverse section assesses degree of calcification of osteons. The average diameter of an osteon measures 240 μm. (Ascenzi, M.-G., Lomovtsev, A. (2006), Collagen orientation patterns in human secondary osteons, quantified in the radial direction by confocal microscopy, *Journal of Structural Biology* 153:14-30).
Figure 1B:
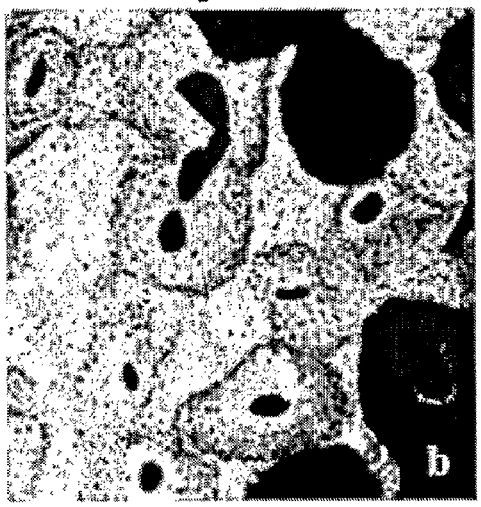

The post mortem femoral shafts, free of evident bone pathology, of five human males aged 25 to 41 provided bone material. The middle shaft of each femur was removed, defleshed and air-dried. A Leitz rotating saw microtome equipped with a continuous water lavage to prevent heating the material was used to section the material. The middle-shafts were cut into 3 cm long transverse sections, in turn cut into 70±4 μm thick transverse sections. Because the osteonic bone varies in degree of calcification, the bone sections were micro-X-rayed (FIG. 1b) by a method described by Amprino and Engström (1952), using a device produced by Ital Structures Company (Italy). The micro-X-ray allowed selection of fully calcified osteons on each transverse shaft section. The chosen fully calcified osteons were then examined under circularly polarized light to reveal the arrangements of extinct and bright lamellae in the osteon cross-section. As used herein, the "extinct" and "bright" connotation of isolated lamellae refers to the lamellar appearance in osteon cross-section prior to isolation. Fully calcified osteons that consist of alternatively extinct and bright lamellae on both longitudinal and transverse (FIG. 1a) sections, so-called alternate osteons, were chosen for lamellar isolation.

Figure 2:
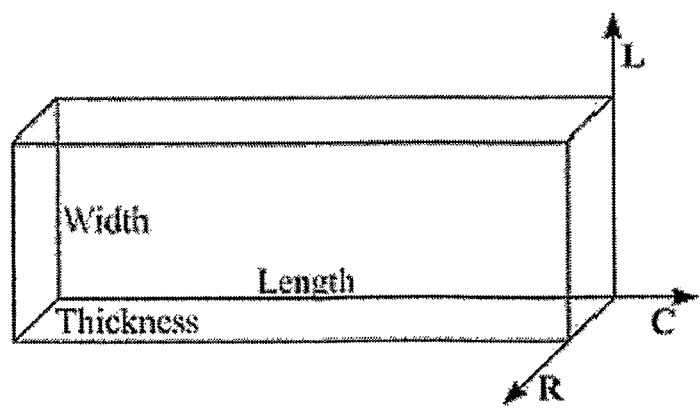
FIG. 2. Schematic three-dimensional drawing (not to scale) of the flattened lamellar specimen. Thickness, length, and width of specimen are indicated as R, C, and L because they refer to radial, circumferential and longitudinal directions, respectively, of the specimen embedded in the osteon prior to isolation. In particular, L parallels the osteon axis direction. (Ascenzi et al., (2006)).
Figure 3A:
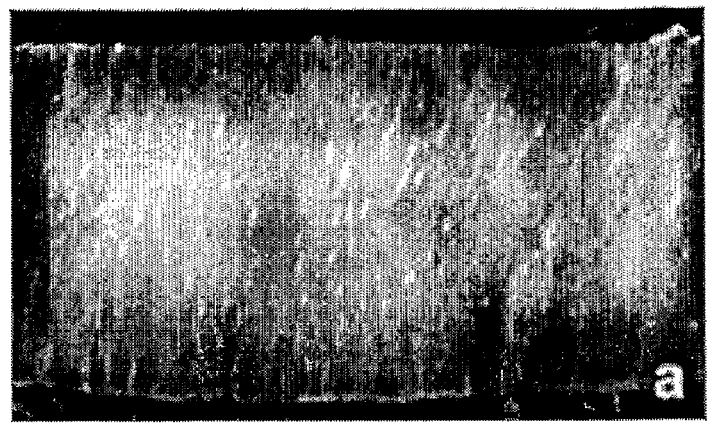
FIG. 3. (a-h) Four successive scans (Nos. 8-11) of extinct lamellar specimen e349 (1221× with 1575× original magnification); the rectangle in (d) indicates the corresponding lamellar detail enlarged in (e)-(h). A 10 μm grid is superimposed to images (e)-(h) for collagen orientation assessment. The width of lamellar specimen e349 measures 68.65 μm. Canaliculae are visible as bright elements in (a)-(d). (Ascenzi et al., (2006)).
Figure 3B:
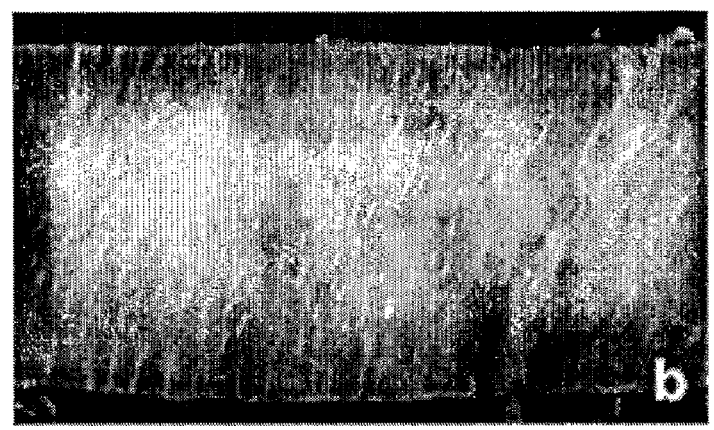
Figure 3C:
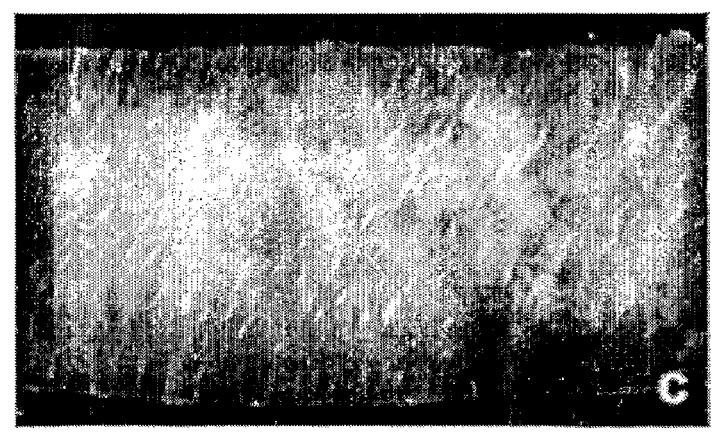
Figure 3D:
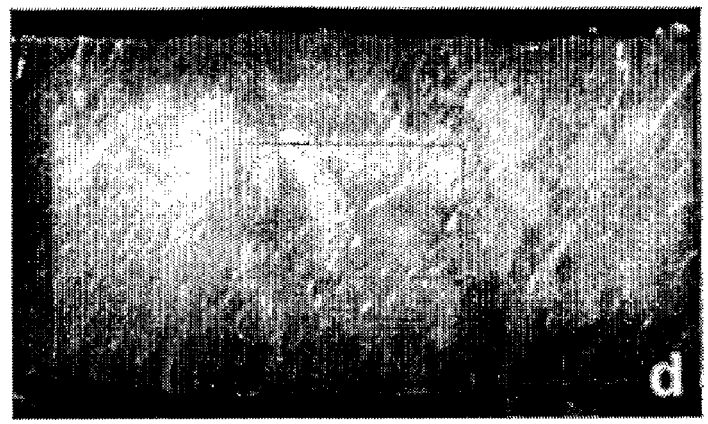
Figure 3E:
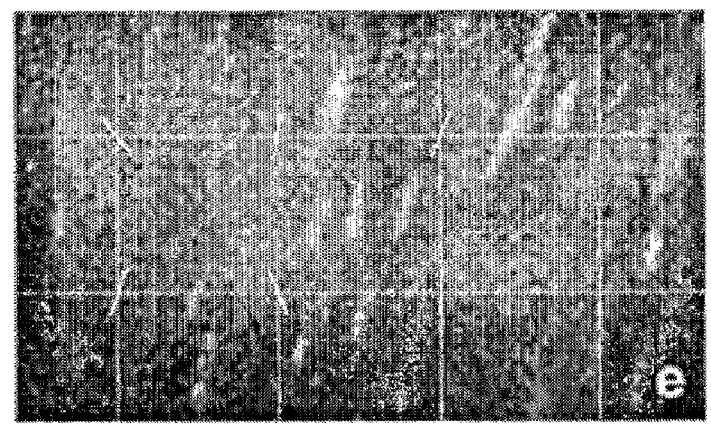
Figure 3F:
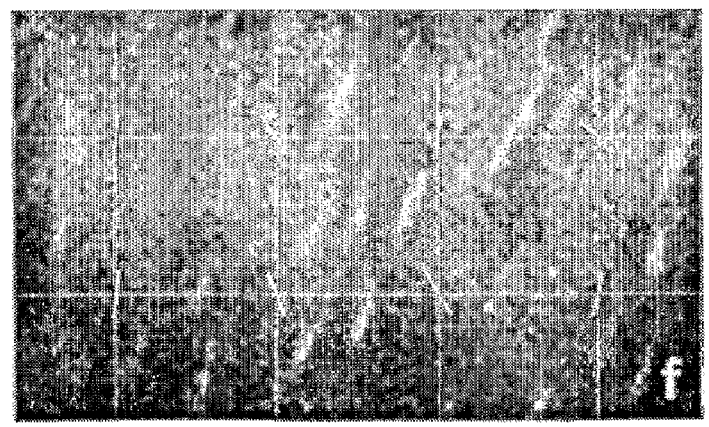
Figure 3G:
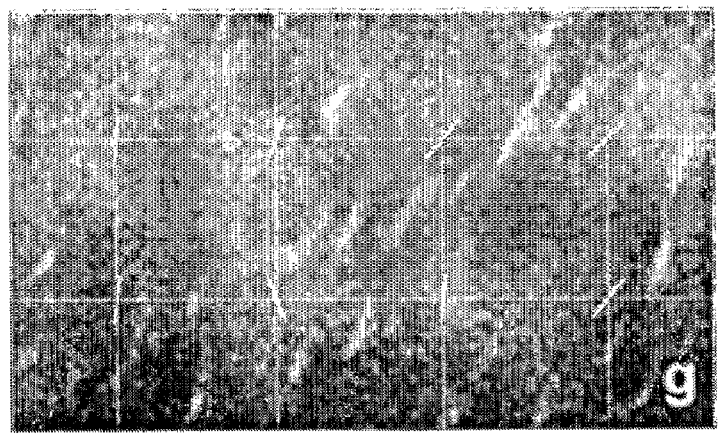
Figure 3H:
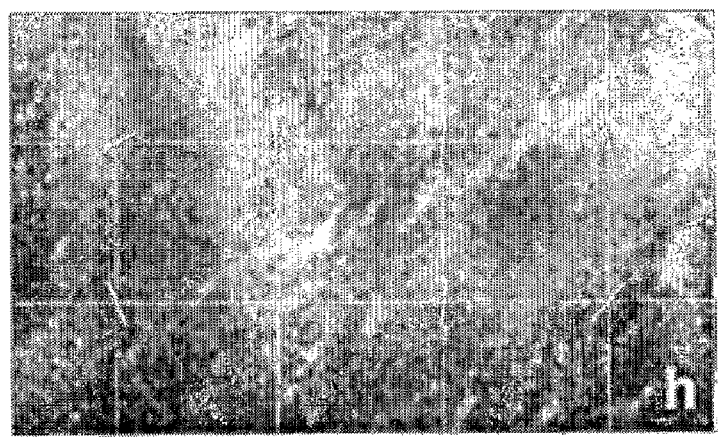
Figure 4A:
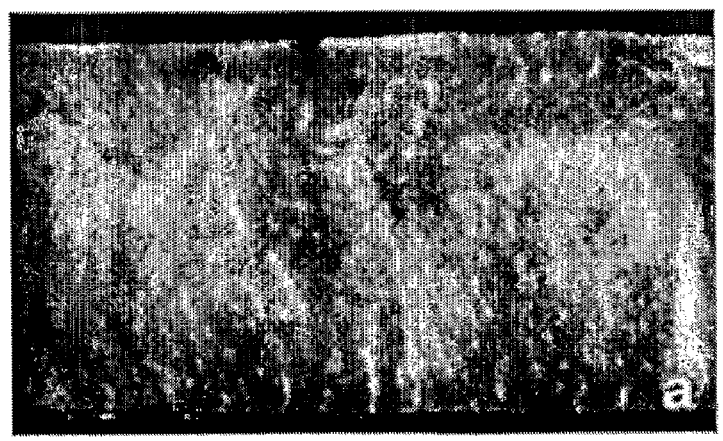
FIG. 4. (a-h) Four successive scans (Nos. 5-8) of bright lamellar specimen b338 (1221×; 1575× original magnification); the rectangle in (d) indicates the corresponding lamellar detail enlarged. A 10 μm grid is superimposed to images (e)-(h) for collagen orientation assessment. The width of lamellar specimen b338 measures 70.8 μm. Canaliculae are visible as bright elements in (a)-(d). (Ascenzi et al., (2006)).
Figure 4B:
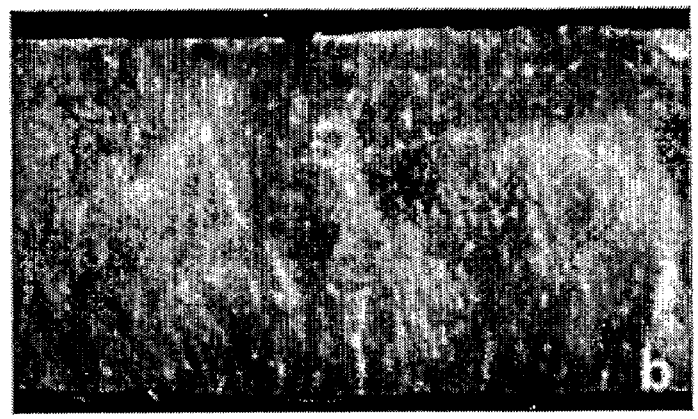
Figure 4C:
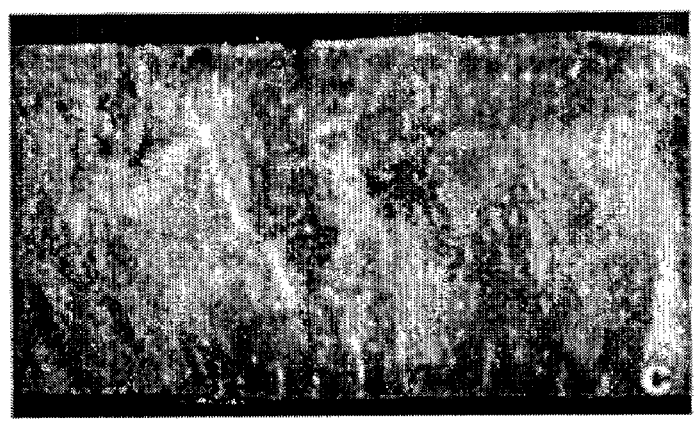
Figure 4D:
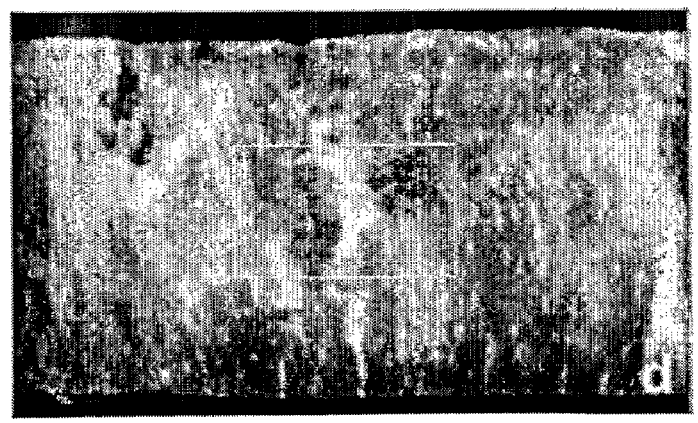
Figure 4E:
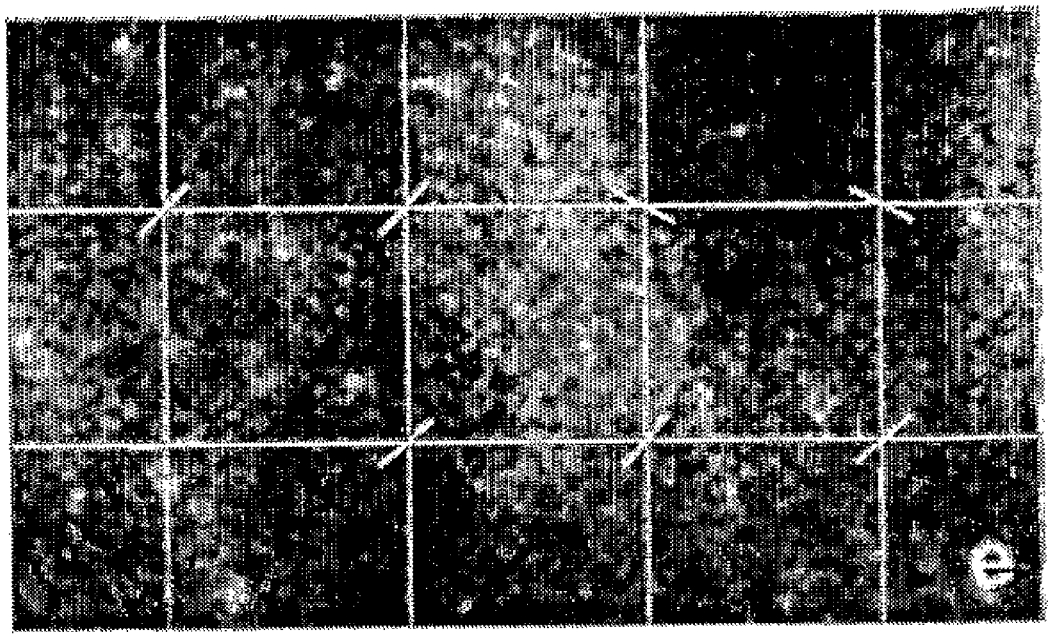
Figure 4F:
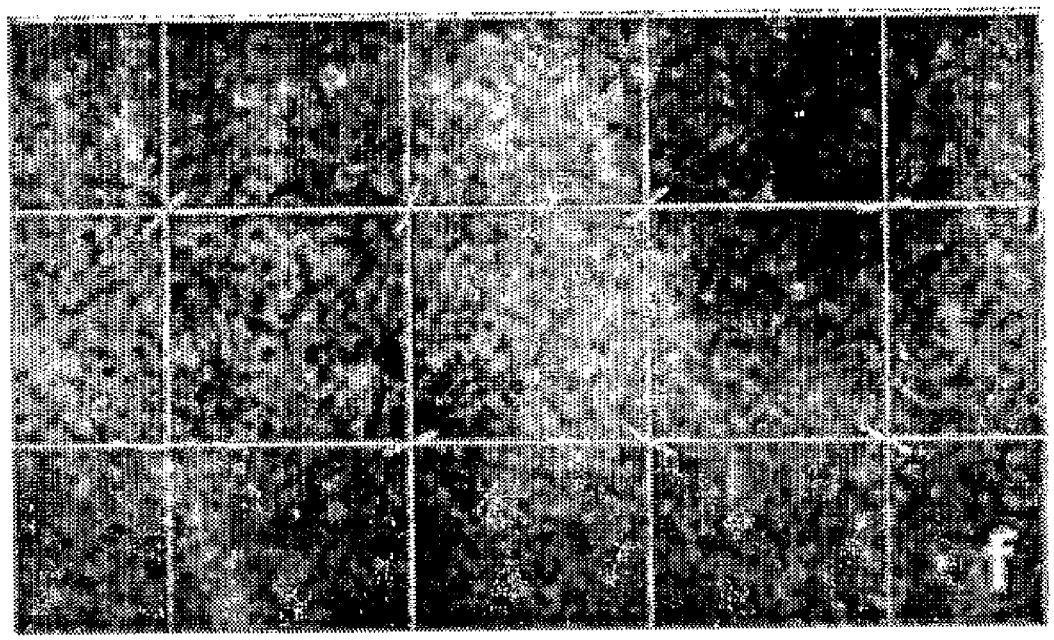
Figure 4G:
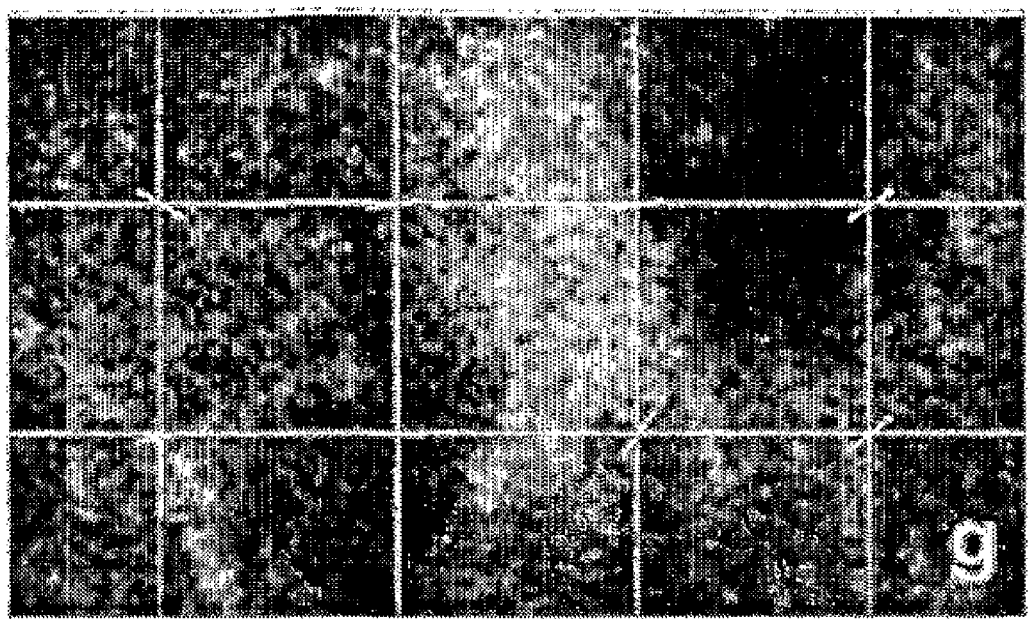
Figure 4H:
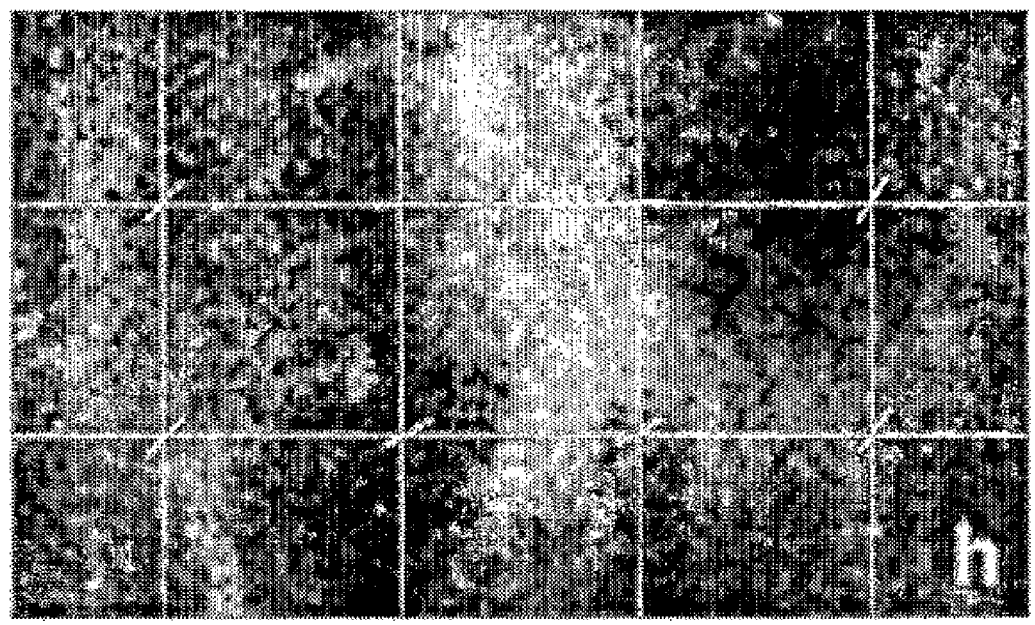

The outermost lamellae were chosen for isolation. XaraX1 software (Xara Group Limited, UK) allowed measurement in triplicate on each of the two sides of the bone section along the circumferential length portion of the lamellar specimen to be isolated. Thickness of the chosen lamellae ranges between 5 and 15 μm for extinct, and between 5 and 13 μm for bright, lamellar specimens. Ascenzi M.-G. et al. (2003) describes the technique employed for specimen isolation. This isolation technique is limited to about half of the lamellar circumference because of the specimen holding requirement. After isolation of the most external lamella portion, the third most external lamella portion is isolated from the adjacent one. Each isolated specimen is gently flattened under a light microscope to check for lack of crack formation and placed on a glass slide under a cover slip. Because small specimen curvature reduces the risks of fractures during flattening, only the most outer lamellae were selected for isolation. The dimension of greatest length of the flattened lamellar specimen corresponds to the circumferential direction of the layer in situ; the specimen width corresponds to the transverse section thickness and osteon length; and, the specimen thickness corresponds to the lamellar thickness in situ (FIG. 2). Because the extinct lamellar thickness range is larger than the bright lamellar thickness range, the number of extinct lamellar specimens (18) analyzed was larger than the number (14) of bright lamellar specimens. Specimens were selected to provide good representation of thickness ranges.

Methods for Structural Analysis

Each lamellar specimen was rehydrated with saline solution and observed by a Leica TCS-SP confocal microscope (Heidelberg, Germany) with krypton laser (568 nm excitation), 63× Planapochromat lens, and 580-700 nm detection wavelength range. The endogenous fluorescence of wet bone provides good contrast between tissue components. Light detected by photomultipliers was converted to pseudo-color for good visualization. Each specimen was scanned every 0.5 μm along its thickness direction, i.e., the radial direction of the specimen when it was embedded in the osteon (R in FIG. 2). The 0.5 μm interval was chosen in relation to plane of focus thickness to avoid either missing or replicating structures. Stacks of confocal images were collected automatically and imported into graphic illustrator XaraX1. The original magnification of 1575× (FIG. 3a-3d and FIG. 4a-4d) was increased to 3748× life size (FIG. 3e-3h and FIG. 4e-4h). The same rectangular region through the scanned image stack, covering 130 μm of the specimen length and its complete width, was chosen for each specimen.

As the magnification was increased towards 3748×, a fibrillar distribution of bright elements covering the whole specimen surface appeared. The fluorescence was due to collagen fibrils (Ascenzi A. et al., 1966) on a background interpreted as a mix of mucopolysaccharides and glycoproteins. Collagen orientation was measured with respect to the lamellar length (L in FIG. 2) at the intersection points of a 10 μm grid at 3748× (see grid detail in FIGS. 3e-3h and 4e-4h).

The present invention, as described herein, involves the assessment of collagen orientation as well as analysis of osteocyte canaliculae and lacunae. Canaliculae were identified on 1575× images as intensely bright elements of a thickness ranging between 0.1 and 1 μm (Atkinson and Hallsworth, 1982). Canaliculae appeared intensely bright on the lamellar scans and more defined than the diffused lower brightness produced by fluorescent collagen fibrils at this lower magnification. The orientation of canaliculae was measured with respect to the lamellar length. The distance between pairs of adjacent canaliculae was measured every 7 μm along the canaliculae on regions where canaliculae were clearly separate and paralleled each other. Osteocyte lacunae were identified by their somewhat elliptical shape, and their orientations and areas were measured. The depth of each osteocyte lacunae, defined as the dimension perpendicular to the plane of focus, was estimated in microns as the number of scans on which the lacuna appears, multiplied by the distance between two successive scans.

Collagen and canaliculae orientations of each extinct and bright lamellar specimen were divided into four groups, corresponding to the indicated angle ranges: Transverse/TRANS [0°-22.5°) and (157.5°-180°]; Oblique Acute/OBLA [22.5°-67.5°); Longitudinal/LONG [67.5°-112.5°]; Oblique Obtuse/OBLO (112.5°, 157.5°]. Following mathematical convention as used herein, a bracket denotes inclusion of the range endpoint and a parenthesis its exclusion. Orientation percentages within a chosen range were computed by dividing the number of orientation occurrences within the given range by the number of discernible orientations at the intersection points of the 10 μm grid.

To assess differences between the two lamellar types, a two-sampled unpaired inference test for proportions (Moore and McCabe, 1999) was applied to the collagen orientation percentages of each of the extinct and bright specimen groups after verifying satisfaction of the conditions of normal approximation to binomial distribution. The significance level was set at 0.05.

The results of the above-described example are discussed below:

Results

Confocal microscopy, paired with image analysis, served to quantify collagen orientation through the thickness of isolated lamellae and to yield information on patterns of orientation distributions along the radial direction of osteons. The relative counts of longitudinal, oblique, and transverse fibril orientations are compared between lamellar types. Table I lists separately by collagen orientation group the total number of collagen observations for the 18 extinct lamellae, for the 14 extinct lamellae whose thickness range is comparable to the thickness range of the bright lamellae, and for the 14 bright lamellae.

TABLE I

| Lamellae | TRANSV | OBLA | LONG | OBLO | TOTAL OBS | TOTAL POINTS |
|---|---|---|---|---|---|---|
| Extinct (18) | 963 | 6316 | 21162 | 4636 | 33077 | 35209 |
|  | 3% | 19% | 64% | 14% | 94% |  |
| Extinct (14) | 654 | 4251 | 14217 | 3387 | 22509 | 24057 |
|  | 3% | 19% | 63% | 15% | 94% |  |
| Bright (14) | 7572 | 6018 | 1001 | 8263 | 22854 | 23725 |
|  | 33% | 26% | 4% | 36% | 96% |  |

Table I shows the number of collagen orientation observations for extinct and bright lamellae per group: (TRANS, 0°-22.5° and 157.5°-180°), oblique acute (OBLA, 45°±22.5° or 135°±22.5°), longitudinal (LONG, 90°±22.5°) and oblique obtuse (OBLO, 135°±22.5°). The number of Total Observations (TOTAL OBS) is the number of instances where collagen orientation was discernable. The Total Points (TOTAL POINTS) is the total number of grid points employed. For each scanned image (and thus structural layer) of a lamellar specimen, collagen orientation was examined at each point of a superimposed grid. Specimens of thickness comparable to the bright specimen thickness are listed in the row under the data for all extinct specimens. Proportions of orientations to Total Observations and of Total Observations to Total Points are listed under respective entries. Of 35,209 locations gridded on the 18 extinct lamellar specimens, collagen orientation was detectable and assessed at 33,077 locations. Of 24,057 locations on the 14 extinct lamellar specimens whose thickness falls within the range of the thickness of the bright lamellar specimens, collagen orientation was detectable and assessed at 22,509. Of the 23,725 locations on the 14 bright lamellar specimens, collagen orientation was detectable and assessed at 22,854 locations.

As shown in Table I, no statistical differences in collagen orientation distributions were found between the extinct lamellar specimens whose thickness was comparable to the thickness of the bright lamellar specimens on the one hand, and the extinct lamellar specimens whose thickness range exceeded the bright lamellar thickness range on the other hand. Statistical difference between specimen types for each orientation group was established on the percentages obtained from the values at Table I relative to the 14 specimens of same thickness range with a p-value<0.01. Specifically, the extinct lamellar type shows a larger percentage of longitudinal orientations of collagen than the bright lamellar type (63% vs. 4%). The extinct lamellar type shows a smaller percentage of oblique (19% vs. 26% and 15% vs. 36%) and of transverse (3% vs. 33%) collagen orientations than the bright lamellar type.

Within each of the two lamellar types, the relative counts of collagen orientations are assessed through the thickness of specimens of that type. The total percentages of locations on scanned images of lamellae at which the collagen orientations are classified, are compared among single lamellar specimens of same and different types (Table II). Consistently for each extinct lamella, longitudinal orientations (LONG, 90°±22.5°) constitute the highest total percentage of the collagen orientations measured, and transverse orientations (TRANS, 0°-22.5° and 157.5°-180°) constitute the lowest. Consistently for each bright lamella, oblique orientations (OBLA, 45°±22.5° or OBLO, 135°±22.5°) constitute the highest percentage of collagen orientation, and longitudinal orientations (LONG, 90°±22.5°) constitute the lowest. Such consistency within lamellar types, as well as the difference between lamellar types, holds true independently from the number of scan images (i.e., independently from the lamellar thickness).

TABLE II

| Lamellae | Number of scans | TRANSV % | OBLA % | LONG % | OBLO % |
|---|---|---|---|---|---|
| Extinct | | | | | |
| e310 | 10 | 4 | 26 | 59 | 11 |
| e386 | 10 | 3 | 23 | 61 | 13 |
| e284 | 11 | 4 | 16 | 68 | 12 |
| e285 | 15 | 5 | 7 | 58 | 30 |
| e143 | 16 | 3 | 15 | 66 | 16 |
| e144 | 17 | 2 | 22 | 66 | 10 |
| e349 | 17 | 4 | 22 | 65 | 9 |
| e135 | 17 | 4 | 18 | 55 | 23 |
| e001 | 20 | 3 | 11 | 63 | 23 |
| e300 | 21 | 3 | 21 | 64 | 12 |
| e141 | 22 | 4 | 18 | 65 | 13 |
| e131 | 24 | 1 | 18 | 64 | 17 |
| e140 | 24 | 0 | 22 | 63 | 15 |
| e296 | 25 | 2 | 21 | 67 | 10 |
| e133 | 28 | 2 | 18 | 71 | 9 |
| e299 | 28 | 3 | 19 | 64 | 14 |
| e142 | 29 | 3 | 19 | 65 | 13 |
| e132 | 30 | 4 | 22 | 64 | 10 |
| Bright | | | | | |
| b242 | 10 | 36 | 45 | 5 | 14 |
| b241 | 11 | 34 | 42 | 6 | 18 |
| b303 | 12 | 40 | 12 | 5 | 43 |
| b338 | 13 | 40 | 49 | 3 | 8 |
| b009 | 14 | 38 | 46 | 6 | 10 |
| b012 | 16 | 34 | 44 | 4 | 18 |
| b304 | 18 | 38 | 14 | 4 | 44 |
| b335 | 18 | 37 | 5 | 6 | 52 |
| b235 | 20 | 41 | 10 | 3 | 46 |
| b013 | 21 | 38 | 14 | 2 | 46 |
| b186 | 23 | 24 | 28 | 6 | 42 |
| b301 | 24 | 18 | 28 | 3 | 51 |
| b302 | 24 | 29 | 16 | 4 | 51 |
| b234 | 26 | 30 | 42 | 4 | 24 |

Table II shows the number of scans and collagen orientation percentage for 18 extinct and 14 bright lamellar specimens within Transverse (TRANS), Oblique Acute (OBLA), Longitudinal (LONG), and Oblique Obtuse (OBLO) groups. The data from the scanned images of each lamellar specimen are here combined into a single set for that lamella. The observation points for each lamella are divided into the TRANS, OBLA, LONG and OBLO groups. The entries are shown as percentages of the discernable observations for the specimen. Extinct and bright specimens are listed separately by increasing scan number, i.e., increasing thickness.

Consistently for each bright lamella throughout its thickness (Table II), oblique orientations (45°±22.5° or 135°±22.5°) constitute the highest percentage of collagen orientation, and longitudinal orientations (90°±22.5°) constitute the lowest.

Figure 5A:
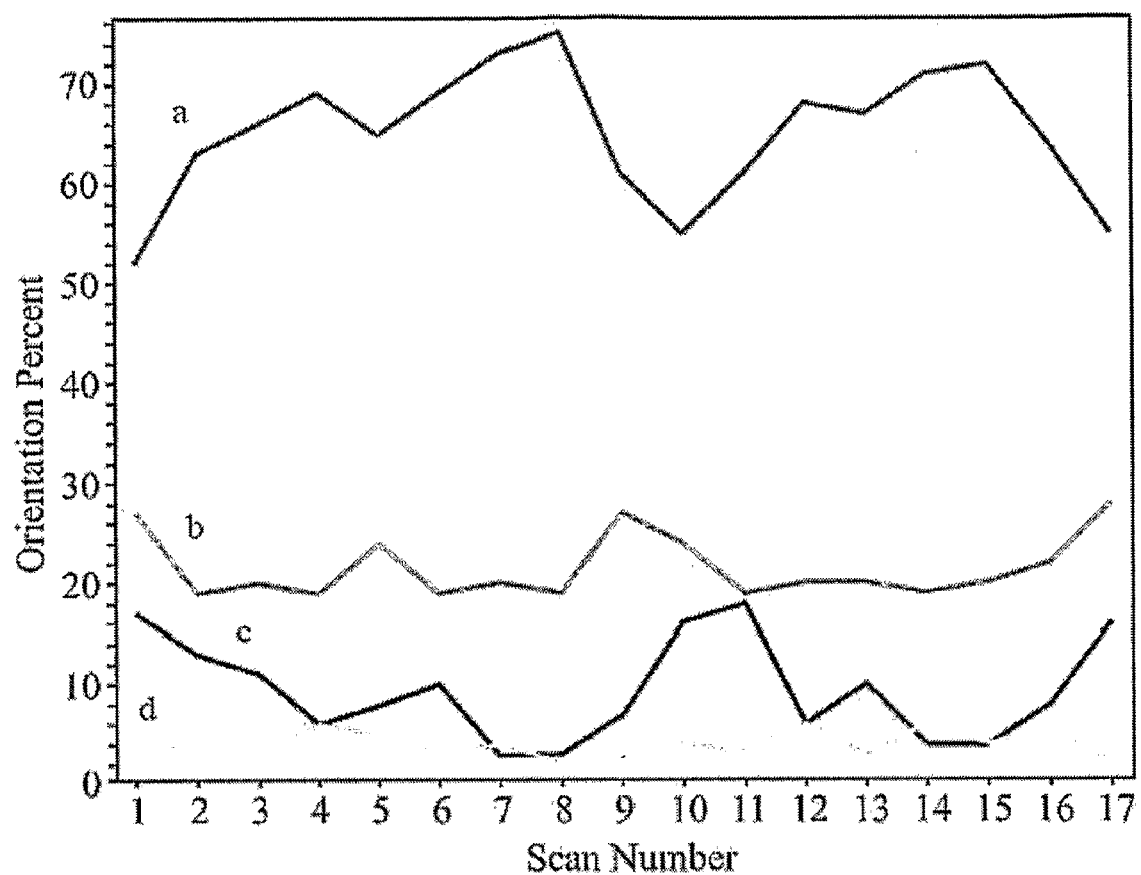
FIG. 5. (a-b) Graphs of collagen fibril orientation. Percentage of transverse (D), oblique acute (B), longitudinal (A), and oblique obtuse (C) fibril orientations measured per scan through the lamellar specimen thickness for: (a) extinct specimen e349; and (b) bright specimen b338. (Ascenzi et al., (2006)).
Figure 5B:
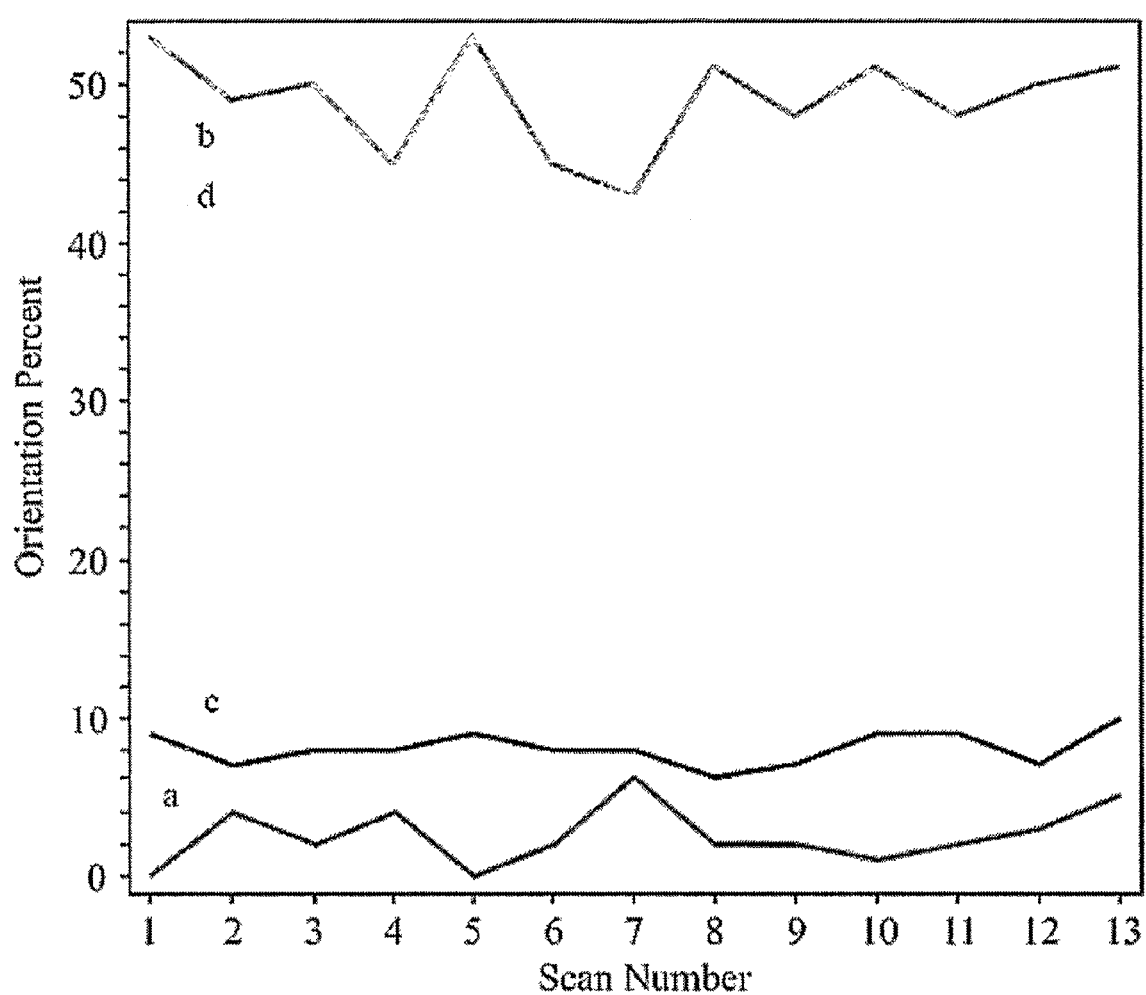

Each lamella presents a collagen orientation pattern along the radial orientation characteristic of its type. Percentages of locations at which the collagen orientations are classified in orientation groups are examined on individual scanned images of each lamellar specimen. FIG. 5 shows data representative of extinct (a) and bright (b) lamellar specimens. In both FIGS. 5a and 5b, the percentages of the number of TRANS (0°-22.5° and 157.5°-180°, "D"), OBLA (45°±22.5°, "B"), LONG (90°±22.5°, "A") and OBLO (135°±22.5°, "C") orientations per scanned image are plotted with respect to the total number of observations per scanned image. Points relative to consecutive scans are connected. In the comparison between (a) and (b), each of the D, B, A, and C trends occupies different levels in the plots which denote different percentage ranges. Each trend shows a general parabolic pattern with a maximum or a minimum point somewhere in the middle third of the plot. Both percentage ranges and parabolic patterns differ between extinct and bright lamellar type.

Figure 6:
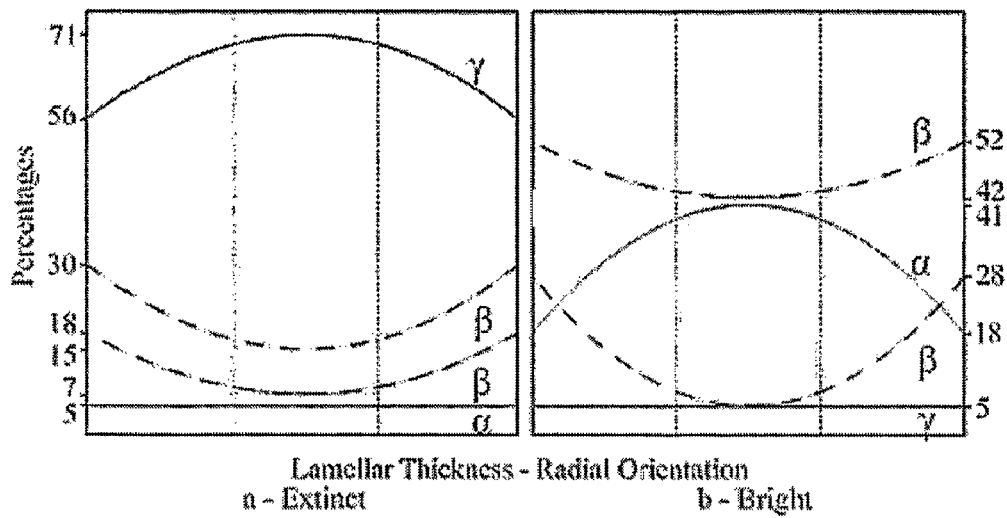
FIG. 6. Diagram of qualitative curves whose shape illustrates patterns of percentages of measured fibril orientation through lamellar thickness for transverse ($\alpha$), oblique ($\beta$) and longitudinal ($\gamma$) collagen orientations for (a) extinct and (b) bright lamellae. Each illustrative parabola shows a range (on the vertical axis relative to shaded region) and either a maximum or a minimum within the middle third of the lamellar thickness (dashed line).

FIG. 6 depicts the parabolic patterns found in qualitative diagrammatic form. Each extinct lamella shows a dominant longitudinally oriented (90°±22.5°) collagen orientation (Table II) that comprises from 56% to 71% of the fibrils. The percentage of longitudinal orientations peaks within the middle third of the lamellar thickness and decreases from the maximum through the outer thirds of the thickness. Conversely, each bright lamella shows a dominant oblique (45°±22.5° or 135°±22.5°) collagen orientation (Table II), which comprises from 42% to 52% of the fibrils. The percentage of dominant oblique orientations reaches a minimum value within the middle third of the lamellar thickness and increases from the minimum through the outer thirds of the thickness. The remaining nondominant orientations are distributed as follows. For extinct lamellae, (1) oblique orientations (within the 45°±22.5° range and the 135°±22.5° range) comprise from 15% to 30% and from 7% to 17% of fibrils; they show minimum percentages within the middle-third of the thickness and increase in percent through the outer thirds of the thickness; and (2) transverse orientations comprise at most 5% of fibrils. For bright lamellae, (1) transverse orientations (within the 0°-22.5° or the 157.5°-180° range) comprise from 18% to 41% of fibrils and peak within the middle-third of the thickness; (2) nondominant oblique orientations comprise from 5% to 28% of fibrils; they show minimum percentages within the middle-third of the thickness and increase in percentage through the thickness, to the outer thirds; and (3) longitudinal orientations within 90°±22.5° comprise at most 5% of fibrils.

Because longitudinal collagen orientations comprise 5% of total fibrils within the bright lamella and comprise from 56% to 71% of extinct lamella fibrils (see Table II), longitudinal orientation is considered characteristic of extinct lamellae. Because transverse collagen orientations comprise 5% of total fibrils within the extinct lamella and from 18% to 41% of bright lamella fibrils (see Table II), transverse orientation is considered characteristic of bright lamellae. As a corollary to the findings that the dominant orientation per lamella is larger for extinct lamellae (56%-71% from Table II) than bright lamellae (42%-52% from Table II), the bright lamella shows higher occurrences of the remaining orientations. In other words, the extinct lamella shows lower variability in terms of collagen orientations than the bright lamella.

Figure 7:
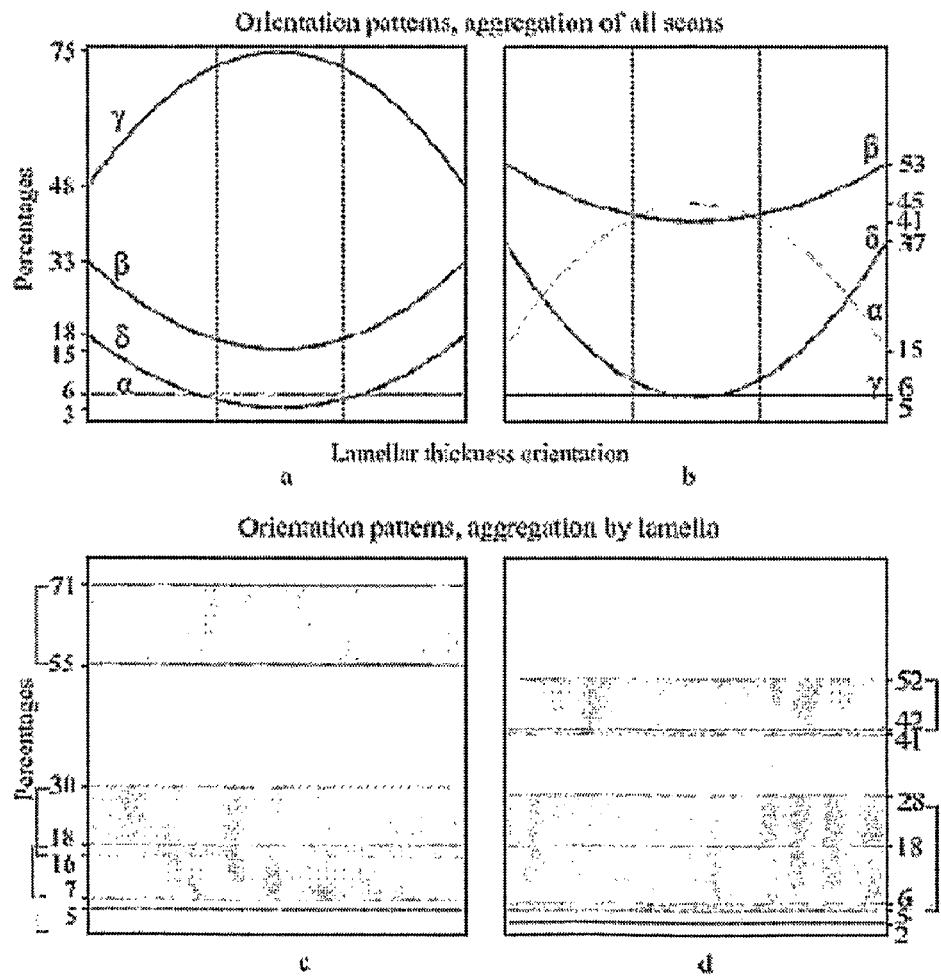
FIG. 7. (a-d) Diagrams of qualitative curves whose shapes illustrates patterns of percentages of measured fibril orientation through lamellar thickness for transverse ($\alpha$), oblique acute ($\beta$), longitudinal ($\gamma$), and oblique obtuse ($\delta$) collagen orientations for (a) extinct and (b) bright lamellae. Each of figures (a) and (b) shows three parabolas and a horizontal line. Each illustrative parabola shows a range (on the vertical axis relative to shaded region) of orientation percentages and either a maximum or a minimum within the middle third of the lamellar thickness (dashed line). The ranges in figures (c) and (d) are obtained from Table II and are depicted as "$\alpha$" for transverse, "$\beta$" for oblique acute, "$\gamma$" for longitudinal, and "$\delta$" for oblique obtuse collagen orientations. Each of the ranges in figure (c) is contained in the corresponding range in figure (a), and each of the ranges in figure (d) is contained in the corresponding range in figure (b). (Ascenzi et al., (2006)).

FIG. 7 depicts the parabolic patterns through the confocal image stacks across scanned images for extinct and bright lamellar specimens in qualitative diagrammatic form. The parabolic patterns are depicted with their ranges and maximum and minimum points by lamellar type. The maximum and minimum values for transverse and longitudinal orientations are the maximum and minimum values of TRANS (0°-22.5° and 157.5°-180°) and LONG (90°±22.5°) respectively among the scans. The maximum and minimum values between OBLA (45°±22.5) and OBLO (135°±22.5°) for all scans were grouped separately. The maximum and minimum of the minimum set of values and the maximum and minimum of the maximum set of values provide the ranges of the oblique orientations for each lamella. The extinct lamellar type (FIG. 7a) shows a dominant longitudinal collagen orientation that comprises from 48% to 75% of the observations. Moreover, the degree of dominance varies according to location within the lamellae. Specifically, the percentage of longitudinal orientations within each extinct lamellae peaks within the middle third of the lamellar thickness and decreases from the maximum through the outer thirds of the thickness (for representative patterns of extinct lamella, see FIG. 5a). Conversely, each bright lamella (FIG. 7b) shows a dominant oblique (45°±22.5° or 135°±22.5°) collagen orientation, which comprises from 41% to 53% of the observations. As for the extinct lamellae, the degree of dominance in bright lamellae varies according to location within the specimen. Specifically, the percentage of dominant oblique orientations reaches a minimum value within the middle third of the lamellar thickness and increases from the minimum through the outer thirds of the thickness.

The remaining nondominant orientations are distributed as follows (FIG. 7). For extinct lamellae, (1) oblique orientations (within the 45°±22.5°range and the 135°±22.5° range) comprise from 15% to 33% and from 3% to 18% of observations; they show minimum percentages within the middle-third of the thickness and increase in percentage through the outer thirds of the thickness; and (2) transverse orientations comprise at most 6% of observations. For bright lamellae, (1) transverse orientations (within the 0°-22.5° or the 157.5°-180° range) comprise from 15% to 45% of observations and peak within the middle-third of the thickness; (2) nondominant oblique orientations comprise from 5% to 37% of observations; they show minimum percentages within the middle-third of the thickness and increase in percentage through the thickness, to the outer thirds; and (3) longitudinal orientations within 90°±22.5°comprise at most 6% of observations.

Because longitudinal collagen orientations comprise from 48% to 75% of extinct lamella observations and comprise up to 6% of total observations within the bright lamella (FIGS. 7a, 7b), longitudinal orientation is considered characteristic of extinct lamellae. Because transverse collagen orientations comprise 6% of total observations within the extinct lamella and from 15% to 45% of bright lamella observations (FIG. 7a, 7b), transverse orientation is considered characteristic of bright lamellae. As a corollary to the findings that the dominant orientation per lamella is larger for extinct lamellae (48%-75%) than bright lamellae (15%-45%), the bright lamella shows higher occurrences of the remaining orientations. In other words, the bright lamella shows higher variability in terms of collagen orientations than the extinct lamella. Note that the intersection of the parabolas relative to dominant oblique collagen and to transverse collagen in bright lamellar type (FIG. 7b) signifies that 20, out of the total 250 scanned images obtained on bright lamellar specimens, show the transverse collagen at up to an additional 4% of location points relative to the elsewhere dominant oblique collagen.

The ranges displayed in FIG. 7a can be compared to the ranges obtained in FIG. 7c, and the ranges in FIG. 7b can be compared to the ranges in FIG. 7d. The ranges depicted in FIGS. 7c and 7d are obtained from Table II by taking the minimum and maximum values of each of TRANS (0°-22.5° and 157.5°-180°) and of LONG (90°±22.5°) orientations groups, and the minimum and maximum values between the values of OBLA (45°±22.5°) and OBLO (135°±22.5°) for each lamella. Each of the ranges in FIGS. 7c and 7d is contained in the corresponding range in FIG. 7a and FIG. 7b (for instance the 56% to 71% range in (c) is contained in the 48% to 75% range in (a) for LONG (90°±22.5°) orientations of extinct lamellae). This is to be expected because the data in (a) and (b) pertain to single scanned images while the Table II data are a combination of individual scan data into a single set for each lamella.

Figure 8A:
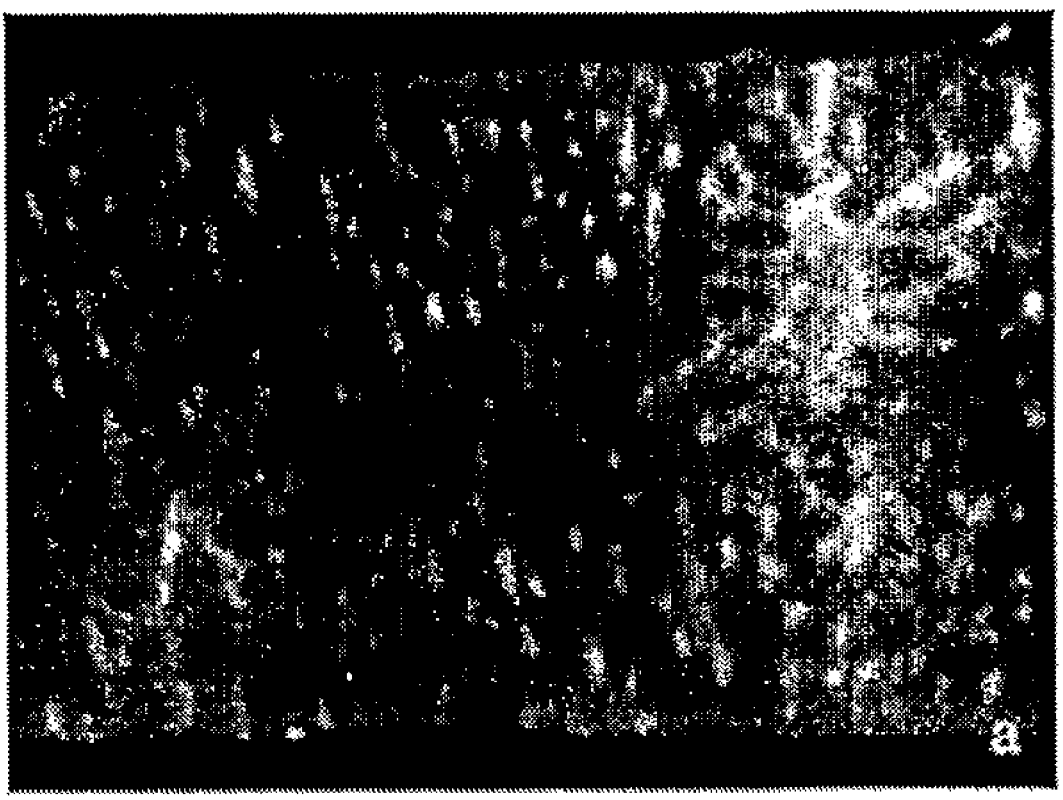
FIG. 8. (a-c) Examples of osteocyte lacunae and relative canaliculae for extinct lamellar specimen (a) e296; (b) e142; and (c) e153 at original 1575×. (Ascenzi et al., (2006)).
Figure 8B:
Figure 8C:
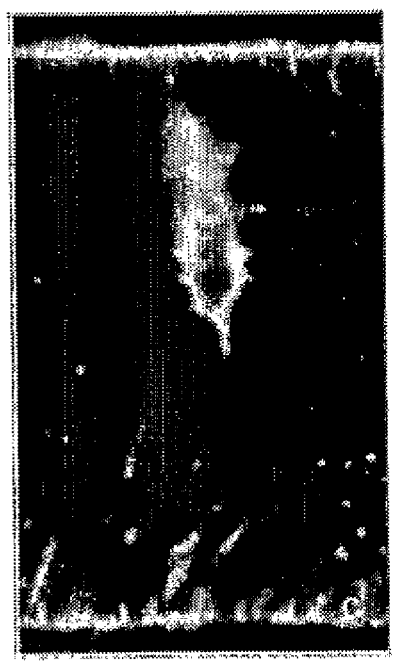
Figure 9A:
FIG. 9. (a-c) Examples of osteocyte lacunae and relative canaliculae for bright lamellae (a) b304; (b) b338 at original 1575×; and (c) b009 at original 3748×. (Ascenzi et al., (2006)).
Figure 9B:
Figure 9C:

The present invention relates not only to quantification of collagen orientation, but also to examination of osteocyte canaliculae and lacunae in lamellar specimens. FIGS. 8 and 9 show canaliculae recognizable as they exit osteocyte lacunae, as well as the canaliculae observable in FIGS. 3 and 4 as the bright elements on the lamellar specimens, distributed throughout both extinct and bright lamellae. Canaliculae appear separate and parallel to other adjacent canaliculae on 13% of the examined lamellar area. The measured distance between such canaliculae ranges between 1.10 and 5.32 µm for extinct and between 1.57 and 5.14 µm for bright lamellae. Up to 5 to 25% of lamellar regions analyzed is occupied on both specimen types by bright dots that correspond to the cross-sections of radially-oriented canaliculae which were cut during the process of isolating the lamellar specimen from the original osteon. In approximately 80% of the area of each analyzed specimen, canaliculae appear as shorter segments that form nested arcs indicative of canaliculae that extend at a small angle with respect to the circumferential-axial orientation of the lamellar boundaries in the original osteon. The relative frequency (percentage of points) of transverse, oblique and longitudinal orientations of osteocyte canaliculae in lamellar specimens follows the distribution patterns observed for collagen orientation (compare Tables II and III).

TABLE III

| Lamella | TRANS (%) | OBLA (%) | LONG (%) | OBLO (%) |
| --- | --- | --- | --- | --- |
| Extinct | | | | |
| e310 | 0 | 81 | 0 | 19 |
| e386 | 0 | 94 | 6 | 0 |
| e284 | 0 | 100 | 0 | 0 |
| e285 | 0 | 94 | 6 | 0 |
| e143 | 0 | 87 | 10 | 2 |
| e144 | 0 | 51 | 33 | 16 |
| e349 | 0 | 92 | 3 | 5 |
| e135 | 0 | 98 | 2 | 2 |
| e001 | 1 | 46 | 13 | 40 |
| e300 | 0 | 95 | 4 | 1 |
| e141 | 0 | 92 | 1 | 7 |
| e131 | 0 | 72 | 10 | 17 |
| e140 | 0 | 45 | 14 | 41 |
| e296 | 0 | 100 | 0 | 0 |
| e133 | 0 | 96 | 4 | 0 |
| e299 | 0 | 87 | 2 | 11 |
| e142 | 0 | 45 | 14 | 41 |
| e132 | 1 | 97 | 2 | 0 |
| Bright | | | | |
| b242 | 10 | 5 | 65 | 20 |
| b241 | 25 | 9 | 54 | 13 |
| b303 | 53 | 5 | 18 | 23 |
| b338 | 6 | 37 | 23 | 34 |
| b009 | 1 | 15 | 23 | 60 |
| b012 | 8 | 20 | 30 | 41 |
| b304 | 25 | 8 | 33 | 34 |
| b335 | 4 | 6 | 45 | 44 |
| b235 | 1 | 4 | 63 | 32 |
| b013 | 1 | 44 | 29 | 25 |
| b186 | 10 | 30 | 42 | 17 |
| b301 | 13 | 15 | 45 | 27 |
| b302 | 2 | 12 | 69 | 17 |
| b234 | 15 | 24 | 27 | 34 |

Table III shows osteocyte canaliculae orientations percentage for 18 extinct and 14 bright lamellar specimens within Transverse (TRANS), Oblique Acute (OBLA), Longitudinal (LONG), and Oblique Obtuse (OBLO) groups.

Osteocyte lacunar sections appear on 5 extinct and 3 bright lamellar images (FIGS. 8 and 9). Two sets of lacunar sections corresponding to two distinct lacunae appear on one extinct lamellar specimen at a longitudinal distance of 11.71 µm and at a circumferential distance of 70.43 µm from each other and on one bright lamellar specimen at a longitudinal distance of 40.21 µm and at a circumferential distance of 120.30 µm. The lacunar section area ranges between 393.29 and 1412.75 µm for extinct, and between 261.12 and 1040.97 µm for bright, lamellae. Lacunar sections appear on a number of scans that ranges between 2 and 7 for extinct and between 2 and 9 for bright lamellae. Lacunar thickness in the original osteon radial direction is therefore estimated from 1 to 3.5 µm for extinct lamellae and from 1 to 4.5 µm for bright lamellae. Lacunar orientation is consistently longitudinal in the extinct lamellar group and either longitudinal or oblique with respect to the original osteon axis in the bright lamellar group. On extinct lamellar specimens, the major lacunar axis demonstrates up to a 10 to 15 degree difference in orientation with the longitudinal axis of original osteon (FIG. 8). On bright lamellae, the major lacunar axis also appears to form a larger angle with the longitudinal orientation (FIG. 9).

The present invention comprises the discovery of new information regarding quantification of collagen orientation through the thickness of the lamellar specimens by scanning confocal microscopy. The direction of observation parallels the radial orientation of the secondary osteon in which the lamella was embedded prior to lamellar isolation. The hypothesis generated from this invention is that the appearance (extinct or bright) of lamellae on osteon cross-section under circularly polarized light is characterized by the patterns of collagen orientations discerned through the lamellar thickness, patterns that are specific to the lamellar type.

The application of confocal microscopy to lamellar specimens, the results, and the advances in modeling are discussed below:

Gebhardt (1906) was the first to formulate a hypothesis on secondary osteon structure in terms of its main elementary components, collagen fibrils and carbonated apatite crystals. He viewed such components as organized to form either an orthogonal or quasi-orthogonal plywood model. Subsequently, many researchers have tried to develop a more complex multidirectional model (e.g., Ascenzi A. et al., 1973; Ascenzi, A. and Bonucci, 1976; Ascenzi A. et al., 1982; Ascenzi A. and Benvenuti, 1986; Giraud-Guille, 1988; Raspanti et al., 1996; Weiner et al., 1997; Ascenzi M.-G. et al., 2003). The multidirectional structure inferred is indicative of bone tissue's high adaptability to form under a variety of mechanical stimulations and its ability effectively to withstand multidirectional shearing forces through a wide stress distribution.

Techniques: Confocal Microscopy Applied to Lamellae

Collagen fibril orientation differences in isolated lamellar specimens of extinct and bright lamellar types have been established on cross-sections of alternate osteons. Polarized light microscopy has yielded the general orientation pattern, and X-ray diffraction the dominant local orientations aggregated through the specimen thickness. Confocal microscopy on a preliminary small set of isolated lamellar specimens (Ascenzi M.-G. et al., 2003) showed its suitability to assess collagen orientation distribution with specific reference to position throughout the specimen thickness. The controllable depth of field, the elimination of image degrading out-of-focus information, and the ability to collect serial optical sections within the thickness of the specimens, allow "separation" through the thickness of overlapping collagen orientations so as to discern the pattern of orientations through the thickness. The 2003 Ascenzi et al. study added information about collagen orientation differences between isolated lamellar specimens of extinct and bright lamellar types, as classified on cross-sections of alternate osteons prior to isolation under polarized light. This study employed polarized light microscopy of flattened lamellar specimens to establish specific orientation differences between lamellar types, and X-ray diffraction to establish differences in terms of the dominant local orientations overlapping through the specimen thickness.

Confocal microscopy of the lamellar specimens employs bone's endogenous fluorescence, also called primary or autofluorescence (Price and Schwartz, 1956). Many biological materials exhibit autofluorescence, the property of atoms and molecules to absorb light at particular wavelengths and after a brief interval subsequently to emit light of wavelength longer than the excitation (or absorption) wavelength (Allen, 1925). Unlike the usual narrow emission spectrum of fluorescent markers, autofluorescence spectra are generally broad, extending over several hundred nanometers (Billinton and Knight, 2001). Because collagen type I, which represents 95% of bone's protein content (Price and Schwartz, 1956; Prentice, 1967), in ligaments and tendons shows a fluorescent spectrum that ranges from 300 nm to 700 nm (see, e.g., Yova et al., 2001), confocal microscopy on lamellar specimens was preliminarily conducted with lasers of various wavelengths within the indicated range. Fluorescent excitation by argon-ion lasers of 405, 514, and 594 nm wavelengths and by a krypton laser of 568 nm wavelength, provides comparable images of unchanged quality of fluorescent elements (FIGS. 3 and 4, (e)-(h) refer to 568 nm wavelength). While the risk of specimen photo-bleaching is generally problematic, photo-bleaching was not observed in the present examples. Demineralization did not change the fluorescent fibrillar pattern and somewhat improved its brightness. The slight increase in brightness is consistent with the removal of carbonated apatite, which provides a somewhat homogeneous cover to the fluorescence of non-decalcified lamellae. Since no other elementary component shows a fibrillar pattern throughout the whole lamellar specimen, the fibrillar autofluorescence on confocal images at 3000-3750× is attributed to collagen.

Autofluorescence should be differentiated here from birefringence, which is due to reciprocal organization of molecules forming sub-microstructural entities. Specifically, birefringence is indicative of substructural orientation. Tropocollagen molecules, which are organized in a crystal structure, are mainly responsible for bone's collagen type I birefringence (Taylor and Cramer, 1963). Although the confocal microscopy produces its fluorescence with a laser light which is polarized by one polarizer, such polarization does not show bone birefringence, which requires crossed polarization.

According to the present invention, collagen orientation was observable at least at 90% of the grid points superimposed on the lamellar specimens (see Total Observations vs. Total Points in Table I). The choice of a 10 µm grid to assess collagen orientation on confocal images followed the evidence produced by a previous X-ray diffraction (Ascenzi, M.-G. et al., 2003) investigation, where such grid size provided a realistic assessment. The observed collagen orientation in the flattened specimen is a good indication of the collagen orientation in the original osteon because the small deformation that carries the specimen from a curved to a flat shape occurs perpendicularly to the circumferential-axial directions. The quantification of collagen orientation provided here refers to the fibrillar elements which fluoresce under confocal microscopy. Each fibrillar element corresponds to multiple collagen fibrils. In fact, detection of single collagen fibril (whose average thickness measures on the order of 60 nm) is only possible at higher resolution, such as with electron microscopy (see, e.g., Ascenzi A. et al., 1966; Boyde and Hobdell, 1969).

In the comparison of collagen appearance between the confocal microscopy images and the higher resolution electron microscopy images of compact bone, collagen fibrils appear more tightly packed in the electron microscopy images. Because the confocal images were taken at a magnification at least 5 times smaller than the electron microscopy images, the resolution of confocal images is lower than that of electron microscopy. The additional 2-3× enlargement of confocal images for collagen orientation assessment reduces the resolution by producing an abrupt transition between dark and bright pixels, reflecting the absence of information which higher magnification microscopy would collect. Such abrupt pixel changes give the fibrillar collagen a loose appearance in the confocal images.

Figure 10:
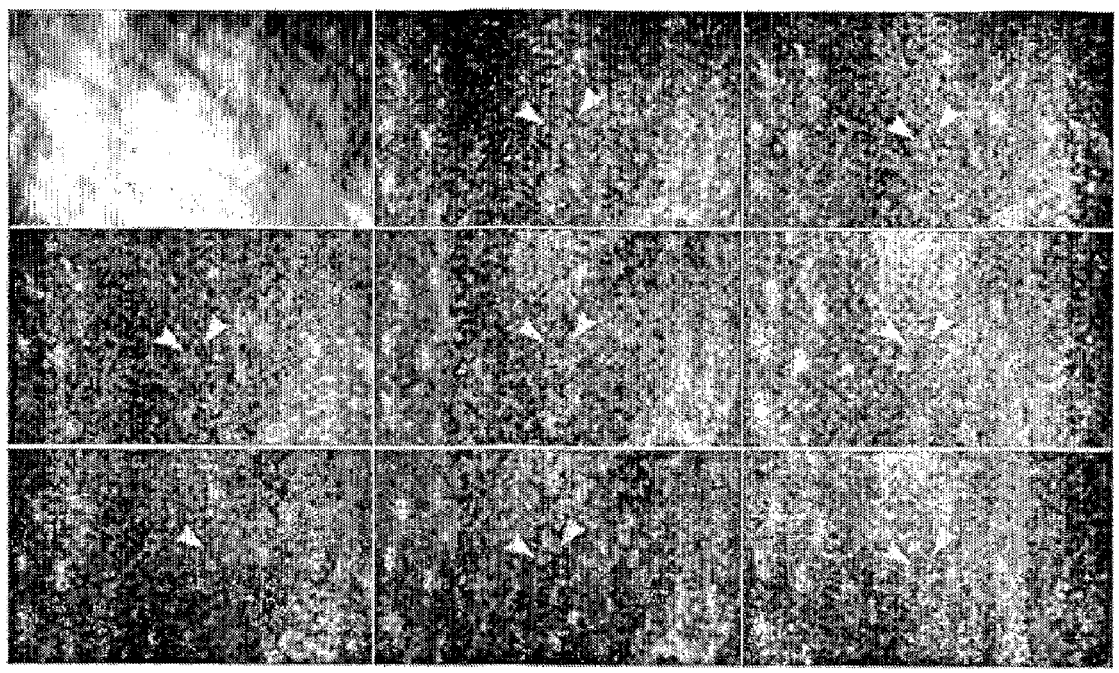
FIG. 10. Comparison of circularly polarized microscopy (enlarged from 529× to 2484×) and of 8 out of 26 confocal images (enlarged from 1575× to 2484×) of central detail of specimen b338 in FIG. 4. Arrows on the polarized light image indicate anisotropy signals at approximately 45° and 135° with respect to specimen length produced by light transmitted through the whole lamellar thickness. Arrow heads on eight adjacent confocal images point to fibrillar collagen oriented at approximately 45° and 135° which contributes to the polarized light signals. Collagen may appear more loosely distributed under confocal microscopy than under polarized light because a confocal image refers to a scan relative to a plane of focus of a thickness on the order 0.5 μm, while a polarized light image refers to the whole thickness at lower magnification. (Ascenzi et al., (2006)).

In the comparison of collagen appearance between confocal microscopy and circularly polarized light microscopy, FIG. 10 shows that the collagen may appear more loosely distributed under confocal microscopy than under polarized light as well. This probably occurs because a confocal image refers to a scan relative to a plane of focus of a thickness on the order of 0.5 µm, while a polarized light image refers to an anisotropic signal produced by light transmitted through the whole lamellar thickness. Arrowheads in FIG. 10 show "contribution" of collagen orientation at approximately 45° and 135° with respect to the specimen length to polarized light signals (indicated by full arrows).

Osteocyte lacunae and canaliculae were observed on confocal images at 1575× magnification. The canaliculae show a considerable distance between each other. Canaliculae departing from osteocyte lacunae are clearly visible in FIGS. 8 and 9. Canaliculae may appear oriented away from the lacunae because they need to run among collagen fibrils of which they inherit the orientation. Nevertheless, the orientation of collagen and adjacent canaliculae may differ (see, e.g., e-h in FIGS. 3 and 4). Specimen observations suggest that the orientation of smaller, thinner collagen spans locally through a larger range than canaliculae. Nevertheless, the orientation of canaliculae falls within the range of the collagen orientations for each specimen type (see FIGS. 3 and 4). It is hypothesized that the orientation of the canaliculae reflects the orientation of the collagen distributed on planes adjacent to the plane on which the canalicula lies, with respect to the thickness direction. Indeed, a few collagen orientations may be observed locally within the thickness of each plane of focus (see, e.g., the local bidirection in FIG. 4e).

The deviation of collagen orientation from the plane of focus, corresponding to deviations from the general coaxial cylindrical organization, may not be able to be assessed directly. In fact, the lamellar structure is not perfectly aligned, but rather wobbles (Ascenzi A. and Benvenuti, 1982; Ascenzi M.-G. et al., 2003) away from the plane of focus parallel to the isolated lamellar specimen boundaries. Such angular deviation is immediately deduced by the presence of shorter segments of canaliculae that form nested arcs (FIG. 4, showing shorter segments of canaliculae form nested arcs). Nested arcs have been observed previously by different microscopy methods on different specimens. For example, electron microscopy shows nested arcs in human compact bone (Giraud-Guille, 1998; Giraud-Guille et al., 2003). The interpretation offered was the occurrence of a non-zero angle between the plane on which the bone structure lies and the plane of cut for specimen preparation. The hypothesized structure was the twisted plywood arrangement. Here, the same type of interpretation applies if the plane of the confocal microscope focus is considered an imaginary plane of cut. Reilly (2000) observed the nested arc patterns within distributions of microcracks. The Reilly study includes observation by confocal microscopy of tensile microdamage in relation to osteocyte lacunae on bovine bone and rat ulna. The images show that tension along the major axis of osteocyte lacunae produces micro-cracks that start at the lacunae and proceed transversely to the lacunae in between and somewhat parallel to the canaliculae starting at the lacuna (see FIG. 2 of Reilly, 2000). Reilly hypothesized that the observed arcs follow the collagen and canalicular arc patterns.

The results generated in accordance with the present invention indicate differences and analogies between extinct and bright lamellae in terms of collagen orientations. Such differences carry through to apatite orientation because collagen fibrils and apatite crystals show the same local orientation in the bone tissue. The parallel collagen-apatite local orientation has been previously demonstrated numerous times, starting with Hodge and Petruska (1963), using a variety of methods. In particular, small and wide angle synchrotron X-ray diffraction has been applied to the same specimen type as the specimens employed in the present invention (Ascenzi M.-G. et al., 2003). Small angle diffraction works with the 64 nm period of the collagen "tinting" the apatite needles, while wide angle diffraction works with the 0.688 nm length of the apatite unit cell along the c-axis that parallels the apatite crystal longer axis. The results of small angle diffraction that refers indirectly to collagen, and of large angle diffraction that refers to apatite crystals, coincide.

Further, the local dominance of collagen-apatite orientation that Adriana Bigi's (Ascenzi M.-G. et al., 2003) observation assessed as unidirectional along the osteon canal direction on extinct specimens and as bidirectional at 45 and 135 degrees on bright lamellar specimens, is compatible with dominant percentages of lamellar area relative to longitudinal and oblique orientations. The dominance, previously assessed comprehensively through the lamellar thickness, is shown in the present invention at specific positions of the lamellar thickness. Further, dominance is viewed within an orientation pattern throughout the thickness. In particular, the observation of the higher concentration of collagen fibrils that are oblique to the original osteon axis as one approaches the radial edges of lamellae of both types is consistent with a continuous change of fibril orientations relative to the radial direction as one approaches and moves on the radius between either lamellae of same type or lamellae of different types. In eight of the 14 bright specimens (see Table II), the dominant orientation occurs in the oblique acute (45°±22.5°) orientation and in the remaining six specimens, the dominant orientation occurs at oblique obtuse (135°±22.5°) orientation with respect to the original osteon axis, which may explain why the lamella that appears bright in osteon cross-section assumes a pre-stress-free helicoidal shaped that wraps itself to the right or to the left around its axis (Ascenzi M.-G., 1999) after isolation. In fact, the hypothesized cause of the pre-stress which views the collagen fibrils as being perhaps themselves pre-stressed, raised the hypothesis that a higher percentage of collagen fibrils in one of the two oblique orientations would be responsible for the wrapping direction of the lamella in its natural state. Such a hypothesis is further substantiated by the present invention.

The observations of domains, defined as areas of essentially unidirectional collagen-apatite orientation (Boyde and Hobdell, 1969), show that domain dimensions are comparable in values to domains observed by scanning electron microscopy near the Haversian canal (Boyde, 1972). Indeed, a 10-100 μm domain size is observed here on both extinct and bright specimen types. The observed size of osteocyte lacunar sections and of osteocyte canaliculae and distances between pairs of lacunar sections on the same specimen are in line with previous measurements obtained by means of polarized light microscopy on transverse sections and on longitudinal hemisections of human alternate osteons (Ascenzi M.-G. et al, 2004). In particular, the measurements obtained are also similar to results obtained by Marotti (1979), and Denisov-Nikolsky and Doktorov (1987).

Advances in Modeling

Compact bone has been modeled extensively as a hierarchical structure (Petersen, 1930). The structural elements of each hierarchical level have been modeled as two-phase composites that come together through homogenization methods as homogeneous structures at the next higher hierarchical level. Collagen-apatite models were developed by Jäger and Fratzl (2000). Osteons were modeled as homogeneous fibers in macrostructural models with isotropic, orthotropic or transversely isotropic mechanical properties (see e.g. Katz, 1981; Hogan, 1992). Single osteons and osteon groups were also modeled in terms of their lamellar types and ultrastructures. The lamellae that form the osteons were viewed as a composite reinforced with either fibers (Currey, 1964, 1969; Pidaparti and Burr, 1992; Aoubiza et al., 1996) or platelets (Wagner and Weiner, 1992; Akiva et al., 1998; Weiner et al., 1999; Kotha and Guzelsu, 2002). The osteon model developed over time from either an orthogonal or quasi-orthogonal plywood structure to a more complex multidirectional structure indicative of bone tissue's high adaptability to form under a variety of mechanical stimulations and its ability effectively to withstand multidirectional shearing forces through a wide stress distribution. Osteons were modeled as homogeneous fibers in macrostructural models with isotropic, orthotropic or transversely isotropic mechanical properties (see, e.g., Katz, 1981; Hogan, 1992). Pidaparti and Burr (1992) and Aoubiza et al. (1996) have modeled the osteonic lamellae at a fixed collagen orientation to estimate the mechanical properties of the osteon of various collagen orientation arrangements. Models of apatite arrangements in the matrix that could account for an increase of both elastic modulus and fracture stress with degree of calcification were explored by Jäger and Fratzl (2000). Ascenzi M.-G. (1999) and Ascenzi M.-G. et al. (2004) introduced the variability of collagen orientation through the lamellar thickness in osteon models, and the presence of lacunae and canaliculae, as well as realization of models that reflect biological variability.

Figure 12:
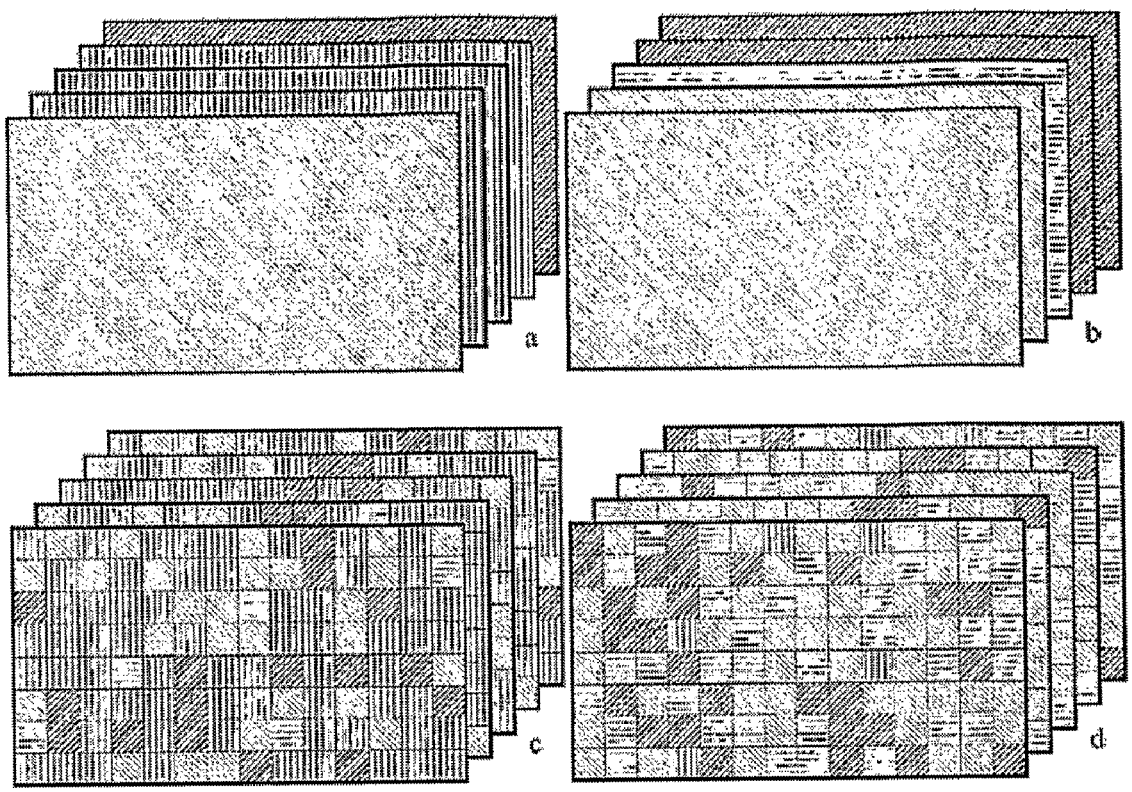
FIG. 12. (a-d) The previously proposed model (Ascenzi M.-G. et al., 2993) for (a) extinct and (b) bright lamella and the newly proposed model for (c) extinct and (d) bright lamella. For each lamellar model, five layers are chosen to represent the collagen orientation at five points of the lamellar thickness. In figures (c) and (d), on each rectangular layer, 10 μm squares are randomly distributed to represent transverse, oblique acute, longitudinal and oblique obtuse collagen orientation. The number of squares with a specific orientation follows the observed patterns depicted in FIG. 7. (Ascenzi et al., (2006)).

The present invention affords a basis for going beyond the above-mentioned modeling. The lamellar models of the present invention utilize critical information on the quantified distribution of collagen orientation throughout the osteon's radial orientation. FIG. 12 depicts the previously proposed model for (a) extinct and (b) bright lamellae and the newly proposed "parabolic distribution" model for (c) extinct and (d) bright lamellae. The previous (a) and (b) models showed an orientation per layer, and the distribution of orientation across layers was not known. The new models (c) and (d) have been built as follows. Because the observations of collagen orientation at the grid points of the scanned lamellar images are representative of the collagen orientations on the whole image, the orientation observed at each point of the grid is extended to a surrounding square of grid size. Therefore, the orientation percentage distributions at the points of the grid and at the squares of the grid are the same. The orientation percentages summarized in FIG. 7 are then employed in FIGS. 12c-12d to describe by means of, for example, five structural layers per lamellar type, the collagen orientation distribution on each layer and radially across the layers. Such information can be included in the databases and the software programs that are adjustable to allow for construction of osteon models that reflect biological variability (Ascenzi M.-G. et al., 2004).

Figure 11:
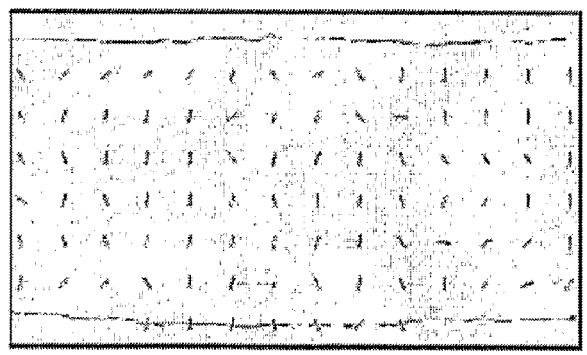
FIG. 11. Example of collagen orientation charts obtained from (a) extinct specimen e349 scan No. 8. The chart indicates the flow of collagen orientation on the circumferential-axial plane (refer to FIG. 2 for definition of directions). (Ascenzi et al., (2006)).

The proposed model uses a random distribution of orientations on each of the layers because the results from the present invention describe distribution of orientations in the specimen's thickness direction as well as percentages of orientations occurring on layers at specific thickness levels, while the authors have not yet investigated the potential existence of orientation distribution patterns at specific layers. Existence of orientation distribution patterns at specific layers will be established by an analysis of flow charts (see, e.g., FIG. 11) obtained from the confocal images of the lamellar specimens employed in the present invention for the best statistics of collagen orientation patterns. Such investigation of orientation patterns will employ machine learning techniques (Hastie et al., 2001) and computer vision technology that recognizes and models image patterns (Zhu et al., 1997; Wu et al., 2000, 2002, 2004). Additionally, three-dimensional images may be created that are statistically equivalent to the three-dimensional reconstruction of confocal images of lamellae. Statistically equivalent images would be expected to show the same mechanical properties at the same level of calcification under mechanical simulation and to predict the collagen distribution of additionally prepared lamellar specimens.

Additionally, information on the quantified distribution of collagen orientation throughout the osteon's radial orientation can be included in databases and software programs that can be adjusted to allow for construction of osteon models that reflect biological variability (Ascenzi M.-G. et al., 2004), as described in the example below.

The collagen orientation and canalicular orientation data per lamellar specimen were separately obtained every 0.5 μm along the z-stack and at the vertices of a 10 μm grid on each image of the z-stack. The data are shown in Tables I and II and parabolic/linear patterns are described for collagen orientation (FIG. 6). The data for both collagen orientation and for canalicular orientation are organized separately into sequences of lists of 3-number sublists and stored in an osteon database (Ascenzi M.-G. et al., 2004) to be used for model construction as explained in the subsection below, "From 3d-grid data to sequence of surfaces."

Simulation of Collagen Orientation in Lamellar Models

A random number, th, that represents the lamellar thickness was chosen between desired thickness range for either lamellar type. For each of the four orientation groups described in FIG. 6, a random number was picked to represent either the maximum or the minimum percentage. Specifically, for the extinct lamellar type, a random number $z_1$ that represents the maximum percentage within the middle third for the LONG group was chosen between 56 and 71 (end-values included); a random number that represents the minimum percentage within the middle third for either OBLA or OBLO was chosen between 15 and 30 (end-values included); a random number that represents the minimum percentage within the middle third for either OBLO or OBLA was chosen between 7 and 18 (end-values included); a random number that represents the constant percentage within the middle third for the TRANS group was chosen between 0 and 5 (end-values included). The four numbers are required to sum to 100.

For the bright lamellar type, a random number $z_2$ that represent the minimum percentage within the middle third for either the OBLO or OBLA group was chosen between 42 and 52 (end-values included); a random number that represent the maximum percentage within the middle third for TRANS was chosen between 18 and 41 (end-values included); a random number that represent the minimum percentage within the middle third for either OBLA or OBLO was chosen between 5 and 28 (end-values included); a random number that represent the constant percentage within the middle third for the HOR group was chosen between 0 and 5 (end-values included). The four numbers are required to sum to 100.

Except for TRANS for the extinct type and VERT for the bright type for which the percent is constant at the chosen value (see horizontal lines in FIG. 6), a random number $z_2$ was picked for each orientation group within the above-mentioned ranges to represent the minimum if beforehand the maximum was represented by $z_1$, and the maximum if beforehand the minimum was represented by $z_1$. The values $z_1$ and $z_2$ need to respect the compatibility conditions as visualized in FIG. 6.

For TRANS for the extinct type and VERT for the bright type, horizontal lines were constructed by means of the equation $z=z_1$.

Except for TRANS for the extinct type and for VERT for the bright type, parabolae, like the qualitative ones sketched in FIG. 6, were constructed by the equation $z=a*(x-x_1)^2+z_1$, where $a=(z_2-z_1)/(th-x_1)^2$ and $(x_1, z_1)$ are the coordinates of the vertex.

For each lamellar type, the z-values for the four orientation groups TRANS, OBLA, OBLO, LONG are required to sum to 100 for each value of x every 0.5 microns, the step of the original z-stack. Such percentages simulate the experimental percentages on each scanned image.

Random numbers within the ranges that define each of the four orientation groups TRANS, OBLA, OBLO and LONG were computed along each of the four percentages evaluated by means of the linear and quadratic equations above for the value of x corresponding to the specifically simulated scanned image. Such random numbers were associated to the coordinates of a two-dimensional lattice that simulates the experimental grid. Such triplets of numbers were organized in a sequence of lists of 3-number sublists and either added to the database or directly utilized as explained in the subsection below, "From 3d-grid data to sequence of surfaces."

Osteon Model Improved with Respect to Collagen Orientation

From 3D-Grid Data to Sequence of Surfaces

A sequence of lists of 3-number sublists appears as follows: for the extinct lamella called e33, the sequence e33s:=seq(e33s[k],k=1 . . . |th/0.5|) where the vertical bars denote the largest integer smaller than or equal to the number that they contain. Each e33s[k] is a list of 3-number sublists. For instance, e33s[6] may look like: e33s[6]=[[1,1,65],[1,2,70], . . . , [14,8,110]]. Here, each sublist, for instance [14,8,110], means that the collagen orientation of 110 degrees occurs at the grid point of coordinates (14,8) on the simulated lamella specimen that measures $(14-1)*10$ μm by $(8-1)*10$ μm.

The data of each element of the sequence e33s, for example e33s[6], is interpolated by means of splines that give rise to nurbs (Piegl and Tiller, 1997) through the following algorithm written with the mathematical software Maple (Waterloo Inc.):

```
SPLxy:=proc(sp,n,xo,yo)
    n is the scan number of the sp specimen, and xo and
    yo are grid coordinates in simulation of flat specimen
    local npx,vnpx,npy,id,forcoo,fu,pairs,ids,ory,ordata,
            ch_ord,xyz_ord,o_ord,p_ord,PP,numE,Ot,D2d,Sxs,
            Sxy;
    global D3d;
```

-continued

```
    npx:=nops(sp[n][1]);
    npy:=nops(sp[n]);
        id:=(x,y)->[x,y];
            forcoo:=[seq(i,i=1..npx)];
            fu:=(j)->[seq(j,i=1..npx)];
            pairs:=[seq(op(zip(id,forcoo,fu(j))),j=1..npy)];
            ids:=(x,y)->[op(x),y];
            ory:=(sp,n)- [seq(op(sp[n][i]),i=1..nops(sp[n]))];
            ordata:=(sp,n)->zip(ids,pairs,ory(sp,n));
            ch_ord:=(j)->zip(id,forcoo,fu(j));
            xyz_ord:=(j,sp,n)->[seq(ory(sp,n)[k],k=(j−1)*npx+1..j*npx)];
    o_ord:=(j,sp,n)->
            zip(ids,ch_ord(j),[seq(ory(sp,n)[k],k=(j−1)*npx+1..j*npx)]);
    p_ord:=(j,sp,n)->
            [seq([o_ord(j,sp,n)[k][1],o_ord(j,sp,n)[k][3]],k=1..npx)];
    numE:=(j)->
            textplot([op(p_ord(j,sp,n)[npx]), 'j'],align={ABOVE,RIGHT});
    Ot:=(j,sp,n,x)->
            Spline(p_ord(j,sp,n),x,degree=4,endpoints='natural');
    D2d:=display(seq(op([plot(Ot(j,sp,n,x),x=1..npx),numE(j),
                    pointplot(p_ord(j,sp,n))]),j=1..npy));
    Sxs:=(sp,n,x)->[seq([j,Ot(j,sp,n,x)],j=1..npy)];
        Sxy:=(sp,n,x,y)->
            Spline(Sxs(sp,n,x),y,degree=4,endpoints='natural');
        D3d:=(sp,n,collo)->
                display(plot3d(Sxy(sp,n,x,y),x=1..npx,y=1..npy,
                        color=collo,thickness=2),
                    pointplot3d({op(ordata(sp,n))},
                    axes=frame,labels=[x,y,z],color=black));
    Sxy(sp,n,xo,yo);
end:
```

Figure 13:
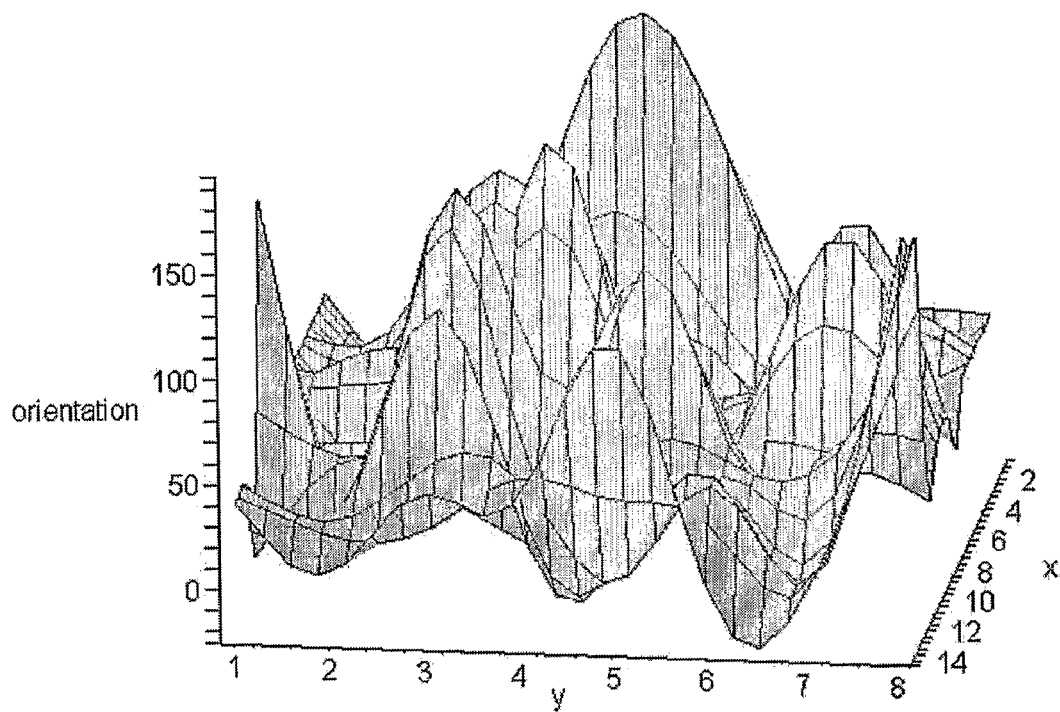
FIG. 13. Modeled collagen orientation on a lamellar scan. An image of surface $SPL_{x,y}(e33,|th/0.5|-1,x,y)$ as x and y range within the ranges of the original grid.
Figure 14:
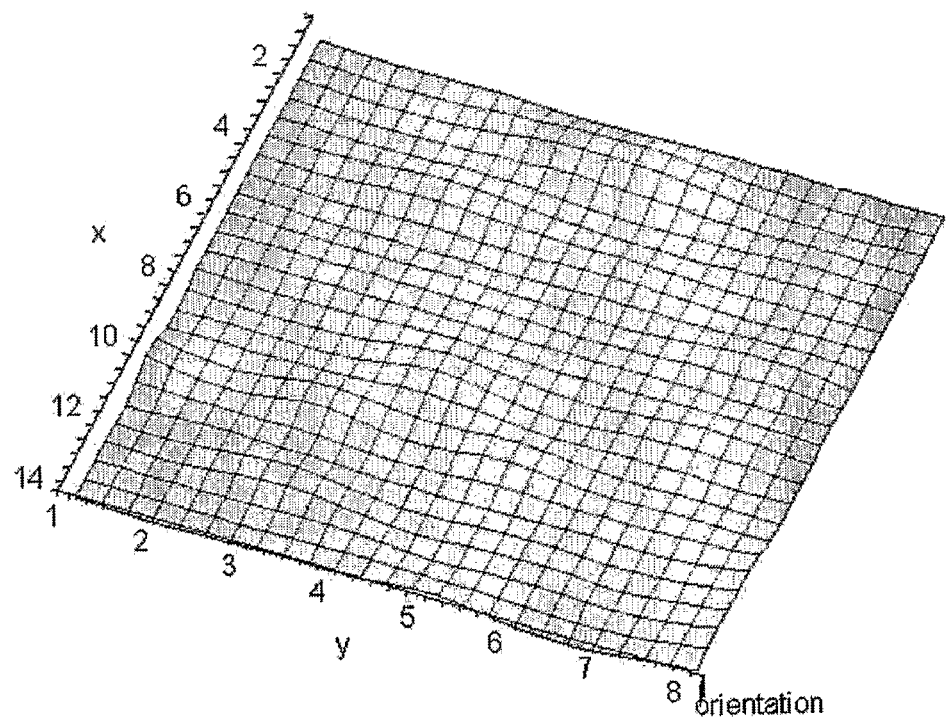
FIG. 14. Modeled collagen orientation on a lamellar scan. An image of surface $SPL_{x,y}(e33,|th/0.5|-1,x,y)$ as x and y range within the ranges of the original grid.

The output of the algorithm $SPL_{xy}$ is a continuous surface relative to the simulated lamella sp that at each grid point of coordinates $(x_o, y_o)$ relative to scan n simulates the collagen orientation. For instance, $SPL_{xy}$(e33,|th/0.5|−1,14,8) outputs 110. Further, because the continuous surface is constructed by interpolation of orientation values at the grid points, the surface can be evaluated at each point within the continuum plane that contains the 2d grid. An image of surface $SPL_{xy}$ (e33,|th/0.5|−1,x,y) as x and y range within the ranges of the original grid is shown in FIG. 13, which is viewed differently in FIG. 14 to evidence the original grid.

Figure 15:
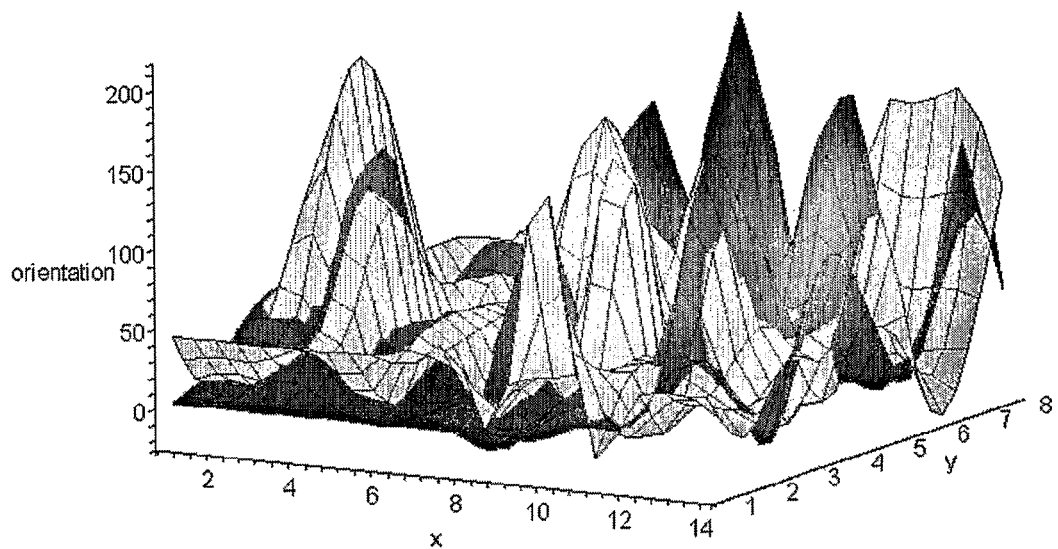
FIG. 15. An image of two adjacent surfaces which belong to a sequence of $|th/0.5|$ surfaces that describe the collagen orientation of simulated specimens e33 along $|th/0.5|$ continuous subsets of xy-planes. The two adjacent surfaces are shown in light grey at $z=|th/0.5|-1$ and in dark grey at $z=|th/0.5|$.

At this point, each simulated specimen is associated to a sequence of |th/0.5| surfaces that describe the collagen orientation along |th/0.5| continuous subsets of xy-planes. Two such adjacent surfaces for e33 are shown in FIG. 15 at z=|th/0.5|−1 in light grey and z=|th/0.5| in dark grey.

From Sequences of Surfaces to 3D Continuum

The following function:

```
SPLyxz:=(dat,y,xo,zo,N)->Spline([seq([k,SPLxz(dat,k,xo,zo)],
                k=1..N)],y,degree=4,
                endpoints='natural'):
``` interpolates through a spline either each of the above-described sequences for N=|th/0.5| or any given sequence of sequences for a suitable N. According to the present invention, the second option may be used to simulate the collagen orientation relative to a sequence of adjacent lamellae embedded in an osteon.

From Isolated to Embedded Lamellar Simulation

The initial experimental data for the present invention was collected from images obtained on each lamellar specimen isolated from the osteon and flattened. Here, formulas that relate polar coordinates R, θ, and Z in the simulated osteon to cartesian coordinates x, y and z in simulated isolated specimen are provided. These formulas provide a transformation of curved embedded lamellar coordinates into flattened isolated lamellar coordinates as follows. An osteon specimen is simulated here as centered at the origin of the coordinate system R, θ, Z with axis parallel to the Z-axis. Our existent algorithm written with Maple (Ascenzi M.-G. et al., 2004) chooses randomly within the database ranges for R, θ and Z that define the osteon and $R_i \leq R \leq R_o$, $\theta_i \leq \theta \leq \theta_o$, $Z_i \leq Z \leq Z_o$. Alternatively, such values may be chosen by the user. Subsequently, the algorithm chooses m lamellar types (extinct or bright) and radii ranges. The i-th simulated lamella would have a radius R ranging between $r_i[i]$ and $r_o[i]$, that is $r_i[i] \leq R \leq r_o[i]$.

The collagen orientation for the i-th simulated lamellar specimen may then be generated as described in the subsection "Simulation of collagen orientation in lamellar models" and denoted by lam[i]. The number of collagen orientation simulation values generated is set by the number of 3D-grid points where the number of points on the x-axis is $\|((r_i[i]+r_o[i])/2)\theta_o/10\|+1$, the number of points on the y-axis, yrg[i], is $\|(r_o[i]-r_i[i])/0.5\|+1$, and the number of points on the z-axis is $\|(Z_o-Z_i)/10\|+1$ where $\|s\|$ indicates the smallest integer greater than or equal to s.

The transformation T: (R, θ, Z)→(R θ, R, Z) maps each simulated lamella embedded in the osteon into the simulated isolated flattened lamella. Therefore, the simulated collagen orientation for the i-th lamella is described by the obtained above function $SPL_{yxz}$(dat, y, xo, zo, N) composed with T, that is $SPL_{yxz}$(lam[i], Rθ, R, Z, yrg[i]). The simulated collagen orientation for the simulated osteon specimen is obtained by interpolating the j-th surfaces relative to the i-th lamella $SPL_{xy}$(lam[i], j, Rθ, Z) for j from 1 to yrg[i] as i ranges from 1 to the number of lamellae NLam inside the simulated osteon ost, that is:

```
SPLyxz:=(ost,y,xo,zo,NLam)->
        Spline([seq(seq([k,SPLxz(dat,k,xo,zo)],
                k=1..yrg[i]),i=1..NLam],
                y,degree=4,endpoints='natural').
```

Improved Osteon Model with Respect to Canalicular Orientation

The simulation of canalicular orientation follows the procedure described in the subsection "Simulation of collagen orientation in lamellar models" with a simplification. In fact, so far we do not see canalicular orientation specific patterns along the specimen thickness. Therefore, the canalicular orientations will be randomly generated for each z-scan for each of the four orientation group TRANS, OBLA, LONG, and OBLO following the percentages that appear in Table III. The procedures described in the subjection "Osteon model improved with respect to collagen orientation" are applied as they are for canalicular orientation simulation in the circumferential-axial (see FIG. 2) planes of the simulated embedded lamellae and of the simulated osteon specimen. Previous models (Ascenzi M.-G. et al., 2004) only included canaliculae on the transversal radial-circumferential plane (see FIG. 2), which corresponds to the plane of focus of specimens observed in cross-section. According to the present invention, the new canalicular orientation data allows one to "join" portions of modeled canaliculae that belong to two different radial-circumferential planes through the experimentally observed orientation. The algorithm uses polynomials and in general splines.

```
tubeplot({[t,8*t-7,0,t=1..1.5,radius=0.5,scaling=constrained],[-t,8*t-7,0,t=1..1.5,radius=0.5,scaling=constrained]});
```

Figure 16:
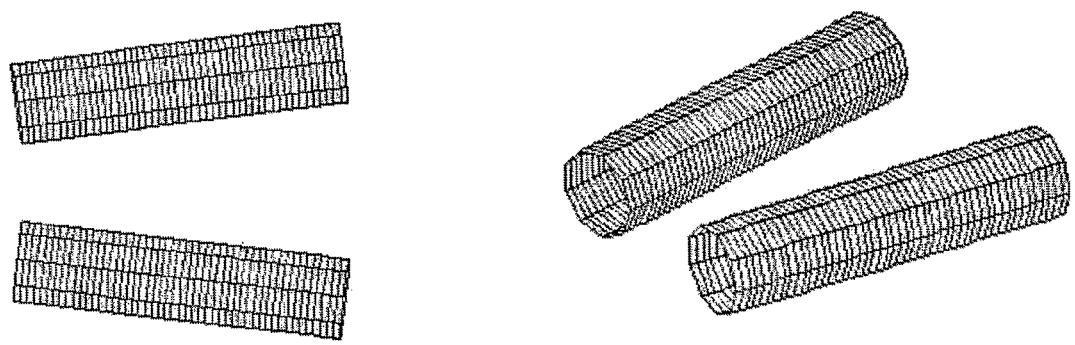
FIG. 16. An image of an example for simulated lamella e33 of two canaliculae initially disjointed on two parallel planes of focus shown under two different view points.

FIG. 16 is an example for simulated lamella e33 of two canaliculae initially disjointed on two parallel planes of focus shown under two different view points.

Figure 17A:
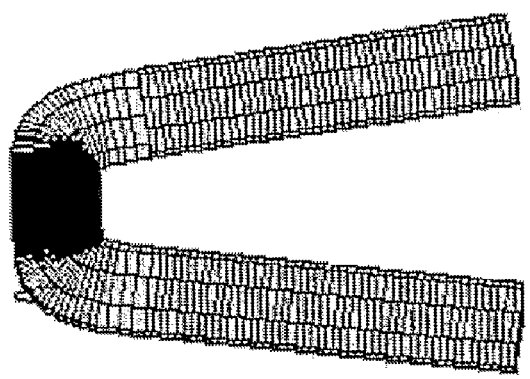
FIG. 17. (a-b) An image of two joined canaliculae forming a continuous structure and shown under two different view points. In image (b), the canalicular orientation simulation of 90° on the circumferential-axial plane with respect to either the embedded lamella or osteon axis is shown.
Figure 17B:

The two canaliculae are joined as follows:

```
tubeplot({[t,t 8,0,t=-1..0,radius=0.5],[t,0,0,t=-1..-1,radius=0.5],[t,t 8,0,t=0..1,radius=0.5],[t,8*t-7,0,
t=1..1.5,radius=0.5],[-t,8*t-7,0,t=1..1.5,radius=0.5]});
``` to form a continuous structure and are shown in FIG. 17 under two different view points. In the right image of FIG. 17, the canalicular orientation simulation of 90° on the circumferential-axial plane with respect to either the embedded lamella or osteon axis is visible.

The present invention may also be applied to the creation of databases, software programs and computer modeling methods that may further be used (e.g., by supercomputers) to assess, quantify, and predict bone deformations and strains and stresses due to the specific forces acting on bone during function.

All references cited and/or discussed in this specification are incorporated herein by reference in their entirety and to the same extent as if each reference was individually incorporated by reference.

BIBLIOGRAPHY

Akiva, U., Wagner, H. D., Weiner, S., 1998. Modeling the three-dimensional elastic constants of parallel-fibred and lamellar bone. J. Mater Sci. 33, 1497-1509.

Allen, H. S., 1925. Pholo-electricity, Longmans, Green and Co, London.

Amprino, R., 1946 reported in Levi, G., Istologia, Unione Tipografico Editrice Torinese, Turin, 3rd ed., pp. 511.

Amprino, R. and Engström, A., 1952. Studies on X-ray absorption and diffraction of bone tissue. Acta Anat. 15, 1-22.

Aoubiza, B., Crolet, J. M., Meunier, A., 1996. On the mechanical characterization of compact bone structure using homogenization theory. J. Biomech. 29, 1539-1547.

Ascenzi, A., 1988. The micromechanics versus the macromechanics of cortical bone—A comprehensive presentation. J. Biomech. Engin. 110, 357-363.

Ascenzi, A. and Benvenuti, A., 1977. Evidence of a state of initial stress in osteonic lamellae. J. Biomech. 10, 447-453.

Ascenzi, A., Baschieri P., and Benvenuti, A., 1994. The torsional properties of single selected osteons. J. Biomech, 27, 875-884.

Ascenzi, A., Ascenzi M.-G., Benvenuti, A., and Mango, F., 1997. Pinching in longitudinal and alternate osteons during cyclic loading. J. Biomech, 30, 689-695.

Ascenzi A. and Benvenuti A., 1982. The tensile properties of single osteonic lamellae: technical problems and preliminary results. J. Biomech. 15, 29-37.

Ascenzi, A. and Benvenuti, A., 1986. Orientation of collagen fibers at the boundary between two successive osteonic lamellae and its mechanical interpretation. J. Biomech. 19, 455-463.

Ascenzi, A., Benvenuti, A., and Bonucci, E., 1982. The tensile properties of single osteonic lamellae: technical problems and preliminary results. J. Biomech. 15, 29-37.

Ascenzi, A. and Bonucci, E., 1967. The tensile properties of single osteon. Anat. Rec. 58 375-386.

Ascenzi, A. and Bonucci, E., 1968. The compressive properties of single osteon. Anat. Rec. 61, 377-392.

Ascenzi, A. and Bonucci, E., 1976. Relationship between ultrastructure and "Pin Test" in osteons. Clin. Orthp. Rel. Res. 121, 275-294.

Ascenzi, A. and Bonucci, E., 1961. A quantitative investigation of the birefringence of the osteon. Acta Anat. 44, 236-262.

Ascenzi, A. and Bonucci, E., 1964. The ultimate tensile strength of single osteons. Acta Anat., 58, 160-183.

Ascenzi, A., Bonucci, E. and Bocciarelli, D. S., 1966. An electron microscope study on primary periosteal bone. J. Ultr. Res. 18, 605-618.

Ascenzi, A., Bonucci, E., Ripamonti, A. and Roveri, N., 1978. X-ray diffraction and electron microscope study of osteons during calcification. Calc. Tiss. Res. 25, 133-143.

Ascenzi, M.-G., 1999. A first estimation of prestress in so-called circularly fibered osteonic lamellae. J. Biomech. 32, 935-942.

Ascenzi, A. and Bonucci, E. (1972) The shearing properties of single osteons. Anat. Rec., 172, 499-510.

Ascenzi, A., Bonucci, E. and Simkin, A., 1973. An approach to the mechanical properties of single osteonic lamellae. J. Biomech. 6, 227-235.

Ascenzi, A., Benvenuti, A., Mango, F. and Simili, R. (1985) Mechanical hysteresis loops from single osteons: Technical devices and preliminary results. J. Biomech., 18, 391-398.

Ascenzi, A., Improta, S., Portigliatti-Barbos, M., Carando, S. and Boyde, A., 1987. Distribution of lamellae in human femoral shafts deformed by bending with inferences on mechanical properties. Bone 8, 319-325.

Ascenzi, A., Baschieri P., and Benvenuti, A. (1990) The bending properties of single osteons. J. Biornech., 23, 763771.

Ascenzi, A., Benvenuti, A., Bigi, A., Foresti, E., Koch, M. H. J., Mango, F., Ripamonti, A., and Roveri, N. (1998) X-ray diffraction on cyclically loaded osteons. Calc. Tissue Int., 62, 266-273.

Ascenzi, M.-G. (1999) Evidence of macroscopic prestress in human femoral shaft, Abstracts of the XVIIth conference of the International Society of Biomechanics, Calgary.

Ascenzi, M.-G. (1999) A first estimation of prestress in so-called circularly fibered osteonic lamellae, J. Biomech., 32, 935.

Ascenzi, M.-G., Benvenuti, A., and Ascenzi, A. (2000) Single osteon micromechanical testing. In: Mechanical testing of bone (An Y. and Draughn R. eds), CRC Press, Boca Raton, Fla.

Ascenzi, M.-G., Ascenzi A., Burghammer M., Panzavolta S., Benvenuti A., Bigi A., (2003) Structural differences between "dark" and "bright" isolated human osteonic lamellae. J. Struct. Biol. 141: 22-33. doi: 10.1016/S1047-8477(02)00578-6.

Ascenzi, M.-G., Benvenuti A. and Ascenzi A., 2000. Single osteon micromechanical testing, in: An, Y. H. and Draughn, R. A. (Eds.), Mechanical Testing of Bone and the Bone-Implant Interface, CRC Press, Boca Raton.

Ascenzi, M.-G., Andreuzzi, M. and Kabo, J. M., 2004. Mathematical modeling of secondary osteons. Scanning, 26, 25-35.

Atkinson, P. J. and Hallsworth, A. S., 1982. The special structure of bone, in: Harrison, R. J. and Navaratman, V. (Eds.), Progress in Anatomy, Cambridge University Press, Great Britain, Vol. 2, pp. 179-199.

Bell, G. H. (1956) Bone as a mechanical engineering problem. In: The Biochemestry and Physiology of Bone (Bourne G. H. ed) Academic Press, New York.

Billinton, N. and Knight, A. W., 2001. Seeing the wood through the trees: a review of techniques for distinguishing GFP from endogenous autofluorescence. An. Biochem. 291, 175-197.

Birkenhäger-Frenkel, D. H., Courpon, P., Hüpscher, E. A. et al. (1988) Age related changes in cancellous bone structure. A two-dimensional study in the transiliac and iliac crest biopsy sites. Bone Miner., 4, 197-.

Bloom, W. and Fawcetts D. (1986) A Textbook of Histology. W.B. Saunders, Philadelphia.

Boyde, A., 1972. Scanning electron microscope studies of bone, in: Bourne, G. H. (Ed.), The Biochemistry and Physiology of Bone, Academic Press, London, Vol. 1, pp. 259-310.

Boyde, A. and Hobdell, M. H., 1969. Scanning electron microscopy of lamellar bone. Z. Zellforsch 93, 213-231.

Burr, D. B., Schaffler, M. B. and Frederickson, R. G. (1988) Composition of the cement line and its possible mechanical role as a local interface in human compact bone. J. Biomech., 21, 939-945.

Carter, D. R., Cater, W. E., Spengler, D. M., and Frankel, V. H. (1981) Fatigue behavior of adult Carter, D. R. and Hayes, W. C. (1977) Compact bone fatigue damage—I. Residual strength and stiffness. J. Biomech., 10, 325-337.

Carter, D. R. and Hayes, W. C. (1976) Fatigue life of compact bone—I. Effects of stress amplitude, temperature and density. J. Biomech., 9, 27-34.

Carter, D. R., Hayes, W. C. and Schurman, D. J. (1976) Fatigue life of compact bone—II Effects of microstructure and density. J. Biomech., 9, 211-218.

Carter, D. R. and Spengler, D. M. (1978) Mechanical properties and composition of cortical bone. Clin. Orthop., 135, 192-217.

Cook, J. and Gordon, J. E. (1964) A mechanism for the control of crack propagation in all brittle systems. Proc. R. Soc. Lond., Ser. A, 282, 508-520.

Currey, J. (1964) Three analogies to explain the mechanical properties of bone. Biorheology 2, 1-10.

Currey, J. (1969) The relationship between the stiffness and the mineral content of bone. J. Biomech. 2, 477-480.

Denisov-Nikolsky, Y. I. and Doktorov, A. A., 1987. Spatial organization of the lacunar-canalicular system in the structure of bone lamellae. Arch. Anat. Hist. Embr. 93, 37-43.

Ebner, V. (v), 1875. Ueber den feineren Bau der Knochensubstanz. Sitzber. Akad. Wiss. Wien III/72, 49-138.

Engström, A. and Engfeldt, B., 1953. Lamellar structure of osteons demonstrated by microradiography. Experientia 9, 19.

Frank, R., Frank, P., Klein, M. and Fontaine, R., 1955. L'os compact humain normal au microscope électronique. Arch. Anat. Micr. Morph. Exp. 44, 191-206.

Frank, R., 1957. Contributions à l'étude au microscope électronique des tissues calcifiés normaux et pathologiques. Thèse de Doctorat en Médecine, Strasbourg, France.

Frasca, P., Harper, R. and Katz, J. (1977) Collagen fiber orientation in human secondary osteons. Acta Anat., 98, 1-13. Frasca, P., Harper, R. and Katz, J. (1981) Strain and frequency dependence of shear storage modulus for human single osteons and cortical bone microsamples-size and hydration effects. J. Biomech, 14, 679-690.

Galilei, G., 1638. Discorsi e dimostrazioni matematiche intorno a due nuoue scienze attenenti alla mecanica & i mouimenti locali, Elzevir, Leiden, pp. 128-130 (available at http://galileo.imss.firenze.it)

Gebhardt, W., 1906. Ueber funktionell wichtige Anordnungsweisen der feineren und gröberen Bauelemente des Wirbeltierknochens. II. Spezieller Teil. 1. Der Bau der Haverssohen Lamellensysteme und seine funktionelle Bedeutung. Arch. Entwickl. Mech Org. 20, 187-322.

Giraud-Guille, M.-M., 1988. Twisted plywood architecture of collagen fibrils in human compact bone osteons. Calc. Tissue Int. 42, 167-180.

Giraud-Guille, M.-M., Besseau, L. and Martin, R., 2003. Liquid crystalline assemblies of collagen in bone and in vitro systems. J. Biomech., 36, 1571-1579.

Hastie, T., Tibshirani, R., Friedman, J. H., 2001. The Elements of Statistical Learning, Springer Verlag, Heidelberg.

Hayes, W. and Carter, D. (1979) Biomechanics of Bone. In: Skeleton Research: An Experimental Approach (D. Simmons and A. Kunin, eds.), Academic Press Inc., New York, 1, 263-299.

Hazama, H. (1956) Study on torsional strength of the compact substance of human being. J. Kyoto Pref. Med. Univ., 60, 167-184 (Japanese text).

Hodge, A. J. and Petruska, J. A., 1963. Recent studies with the electron microscope on ordered aggregates of the tropocollagen macromolecules, in: Ramachandran G. N. (Ed.), Aspects of Protein Structure, Academic Press, London, pp. 289-300.

Hogan, H. A, 1992. Micromechanics modeling of Haversian cortical bone properties. J. Biomech., 25, 549-556.

Hohling, H. J., Barckhaus, R. H., Krefting, E. R., Althoff, J. and Quint, P. (1990) Collagen mineralization: aspects of the structural relationship between collagen and apatite crystallites. In: Ultrastructure of Skeletal Tissues: Bone and Cartilage in Health and Disease (E. Bonucci and P. M. Morra, eds.), Kluwer Academic Publishers, Boston, 41-62.

Huja, S. S., Hasan, M. S., Pidaparti, R., Turner, C. H., Garetto, L. P. and Burr, D. (1999) Development of a fluorescent light technique for evaluating microdamage in done subjected to fatigue loading. J. Biomech., 32, 1243-1249.

Jäger, I. and Fratzl, P., 2000, Mineralized collagen fibrils: A mechanical model with staggered arrangement of mineral particles. Biophys. J., 79, 1737-1746.

Jepsen, K. J. and Davy, D. T. (1997) Comparison of damage accumulation measures in human cortical bone. J. Biomech., 30, 891-894.

Katz, J. L., 1981. Composite material models for cortical bone, in: Cowin, S. C. (Ed.), Mechanical Properties of Bone, American Society of Mechanical Engineers, New York, AMD, Vol. 45, 171-184.

Kleerekoper, M., Villanueva, A. R., Stanciu, J., et al. (1985) The role of three-dimensional trabecular microstructure in the pathogenesis of vertebral compression fractures. Calc. Tissue. Int., 37, 594-597.

Koch, J. C. (1917) The laws of bone architecture. Am. J. Anat., 21, 177-293.

Kölliker, A., 1854. Manual of man microscopical anatomy, Lippincott, Grambo and Co, Philadelphia.

Kotha, S. P. and Guzelsu, N., 2002. Modeling the tensile mechanical behavior of bone along the longitudinal direction. J Theor Biol., 219, 269-79.

Leeuwenhoek, A. (v), 1693. An extract of a letter from Mr. Anth. Van. Leeuwenhoek, containing several observations on the texture of the bones of animals compared with that of wood: on the bark of trees: on the little scales found on the cuticula, etc. Philos. Trans. R. Soc. London 202, 838-843.

Marotti, G., 1979. Osteocyte orientation in human lamellar bone and its relevance to the morphometry of periosteocytic lacunae. Metab. Bone Dis & Rel. Res., 1, 325-333.

Marotti, G. and Muglia, M. A., 1988. A scanning electron microscope study of human bone lamellae. Proposal for a new model of collagen lamellar organization. Arch. Ital. Anat. Embriol. 93, 163-175.

Marotti, G., Muglia, M. A., Palumbo, C., and Zoffe, D. (1994) The microscopic determinants of bone mechanical properties. Ital. J. Miner. Electrolyte Metab., 8, 167-175.

Moore, D. S. and McCabe, G. P., 1999. Introduction to the Practice of Statistics, W.H. Freeman & Co, New York.

Petersen, H., 1930. Die Organe des Skeletsystems, in Möllengorff (v.), W. (Ed.) Handbuch der mikroskopischen Anatomie des Menschen, Springer, Berlin, Vol. 2, Part 2, pp. 521-678.

Pidaparti, R. M. V. and Burr, D. B., 1992. Collagen fiber orientation and geometry effects on the mechanical properties of secondary osteons. J. Biomech. 25, 869-880.

Piegl, L. and Tiller, W. (1997) The NURBS Book. Springer-Verlag, Berlin Heidelberg, Germany Prentice, A. I. D., 1967. Autofluorescence of bone tissues. J. Clin. Path., 20, 717-719.

Price, G. R. and Schwartz, S., 1956. Fluorescence microscopy, in: Oister, G. and Pollister, A. W. (Eds.) Physical techniques in biological research, New York, Academic Press, Vol. 3, pp. 91-148.

Ranvier, L., 1887. Traité Technique d'Histologie, F. Savy, Paris.

Raspanti, M., Guizzardi, S., Strocchi, R. and Ruggeri, A., 1996. Collagen fibril patterns in compact bone: preliminary ultrastructural observations. Acta Anat. 155, 249-256.

Reid, S. A., 1986. A study of lamellar organization in juvenile and adult human bone. Anat. Embriol. 174, 329-338.

Reilly, G. C., 2000. Observation of microdamage around osteocyte lacunae in bone. J. Biomech. 33, 1131-1134.

Rouillier C.-H., Huber, L., Kellenberger, E.-D. and Rutishauser, E., 1952. La structure lamellaire de l'ostéone. Acta Anat. 14, 9-22.

Ruth, E. B., 1947. Bone studies. I. Fibrillar structure of adult human bone. Amer. J. Anat. 80, 35-53.

Rybicki, E. F., Simonen, F. A., and Weis, E. B. (1972) On the mathematical analysis of stress in the human femur. J. Biomech., 5, 203-215.

Smith, J. W., 1960. The arrangement of collagen bundles in human secondary osteons. J. Bone Jt. Surg. 42B, 588-605.

Taylor, E. W. and Cramer, W., 1963. Birefringence of protein solutions and biological systems. II. Studies on TMV, tropocollagen, and paramyosin. Biophys J. 3, 143-54.

Vincent, J., 1957. Corrélation entre la microradiographie et l'image en lumière polarisée de l'os secondaire. Exp. Cell. Res. 13, 422-424.

Wagner, H. D. and Weiner, S., 1992. On the relationship between the microstructure of bone and its mechanical stiffness. J. Biomech., 25, 1311-20.

Weindenreich, F., 1930. Das Knochengewebe, in: von Mollendorff, W. (Ed.), Handbuch der mikro-skopischen Anatomie des Menschen, Springer, Berlin, pp. 391-520.

Weiner, S., Arad, T., Sabanay, I., and Traub, W., 1997. Rotated plywood structure of primary lamellar bone in the rat: orientations of the collagen fibril arrays. Bone 20, 509-514.

Weiner, S., Traub, W., Wagner, H. D., 1999. Lamellar bone: structure-function relations. J. Struct. Biol. 126, 241-255.

Wu, Y., Guo, C. and Zhu, S. C., 2004. Perceptual Scaling, in: Gelman, A. and Meng, X. L. (Eds.), Perceptual Scaling. Applied Bayesian Modeling and Causal Inference from Incomplete-Data Perspectives, John Wiley & Sons, Weinheim, Germany, pp. 343-360.

Wu Y., Zhu S. C., Guo C., 2002. Statistical modeling of texture sketch, Proceedings of European Conference of Computer Vision, Nice, France.

Wu Y., Zhu S. C., Liu X., 2000. Equivalence of Julesz texture ensembles and FRAME models, Intern, J. Comp. Vision 38, 247-265.

Yova, D., Hovhannisyan, V, Theodossiou, T., 2001, Photochemical effects and hypericin photosensitized processes in collagen, J. Biomed. Opt., 6, 52-7.

Zhu S. C., Wu Y., Mumford D. B., 1997: Filter, Random field, And Maximum Entropy (FRAME): towards a unified theory for texture modeling, Intern, J. Comp. Vision, 27, 107-126.

Ziegler, 1908. Studien über die feinere Struktur des Röhrenknochens und dessen Polarization. Dtsch. Z. Chir. 85, 248-262.

Ziv, V., Wagner, M. D., and Weiner, S. (1996) Microstructure-microhardness relations in parallel-fibered and lamellar bone. Bone, 19, 417-428.

Zysset, P. K., Guo X. E., Hoffler C. E., Moore K. E., and Goldstein S. (1999) Elastic modulus and hardness of cortical and trabecular bone lamellae measured by nanoindentation in the human femur. J. Biomech., 32, 1005-1012.

The invention claimed is:

1. A method of modeling bone structure, comprising:
   (a) obtaining a bone specimen from a subject and identifying at least one osteon embedded therein;
   (b) recording a radial direction of the osteon;
   (c) identifying each lamella of the osteon as a bright or extinct lamella;
   (d) isolating at least one lamellar specimen from the osteon by micro-dissection and flattening the lamellar specimen;
   (e) identifying a plurality of planes of focus throughout a thickness of the lamellar specimen, wherein the planes of focus are relative to the radial direction of the osteon;
   (f) for each plane of focus throughout the thickness of the lamellar specimen relative to the radial direction of the osteon, observing and recording angles of orientation of collagen fibrillar elements present in the plane of focus for specimen using confocal microscopy and categorizing each collagen fibrillar element as having a transverse, longitudinal, oblique acute, or oblique obtuse orientation with respect to a lamellar length based on an angle of orientation recorded for the collagen fibrillar element;
   (g) for each plane of focus throughout the thickness of the lamellar specimen, determining a distribution of each category of collagen fibrillar element orientation as a percentage of a total number of collagen fibrillar elements observed; and
   (h) modeling the collagen fibrillar element orientation distributions for the planes of focus throughout the thickness of the lamellar specimen into a three-dimensional model of a bone structure.

2. The method of claim 1, wherein the subject bone is a bone from a mammal.

3. The method of claim 1, wherein the subject bone exhibits autofluorescence.

4. The method of claim 1, wherein the osteon specimen is fully calcified.

5. The method of claim 1, wherein the bright and extinct lamellae are observed under circularly polarized light.

6. The method of claim 1, wherein the angles of orientation of collagen fibrillar elements are recorded for successive planes of focus through the thickness of the lamellar specimen.

7. The method of claim 1, wherein:
the transverse collagen fibrillar elements have an angle range of 0°-22.5° or 157.5°-180° with respect to the lamellar length;
the longitudinal collagen fibrillar elements have an angle range of 90°±22.5° with respect to the lamellar length;
the oblique acute collagen fibrillar elements have an angle range of 45°±22.5° or 135°±22.5° with respect to the lamellar length; and
the oblique obtuse collagen fibrillar elements fibrils have an angle range of 135°±22.5° with respect to the lamellar length.

8. The method of claim 1, wherein step (f) further comprises, for each plane of focus throughout the thickness of the lamellar specimen, observing and recording angles of orientation relative to the radial direction of the osteon of osteocytic lacunae and canaliculae present in the plane of focus.

9. The method of claim 1, wherein step (f) further comprises superimposing a grid having intersection points that are 10 μm apart or less onto a confocal image of the lamellar specimen.

10. The method of claim 9, wherein the angles of orientation of the collagen fibrillar elements are observable at least at 90% of the superimposed intersection points.

11. The method of claim 1, wherein the three-dimensional model is created from an osteon database comprising the recorded angles of orientation of collagen fibrillar elements organized into sequences of lists of 3-number sublists.

12. The method of claim 11, wherein the sequences of lists of 3-number sublists correspond to a sequence of surfaces describing the collagen fibrillar element orientation along a continuous subset of xy-planes.

13. The method of claim 12, wherein the sequence of surfaces corresponds to a 3-dimensional continuum.

14. The method of claim 8, wherein the three-dimensional model is created from an osteon database comprising the recorded angles of orientation of lacunae and canaliculae organized into sequences of lists of 3-number sublists.

15. A composite bone comprising a material having the collagen fibrillar element orientation distribution as recorded using the method of claim 1.

16. A composite bone comprising a material having the collagen fibrillar element orientation distribution of the osteon of osteocytic lacunae and canaliculae as recorded using the method of claim 9.

17. The method of claim 10, wherein the step of modeling the collagen fibrillar element orientation patterns into a three-dimensional model of a bone structure comprises:
(i) representing an identified plane of focus of the lamellar specimen as a grid comprising points corresponding to the intersection points of the superimposed grid; and
(ii) for each plane of focus throughout the thickness of the lamellar specimen, assigning the angles of orientation observed at the intersection points to squares on the grid that surround the intersection points.

18. The method of claim 17, wherein collagen fibril element orientations are distributed among the squares of the grid based on the percentage of each category of collagen fibril element orientation that is observed for the plane of focus.

19. A non-transitory machine-readable storage medium embodying executable instructions which when executed on one or more machines perform operations comprising:
(a) observing and recording angles of orientation for collagen fibrillar elements present in a plane of focus identified in a lamellar specimen isolated from an osteon using confocal microscopy, wherein the plane of focus is relative to a radial direction of the osteon, and categorizing each collagen fibrillar element as having a transverse, longitudinal, oblique acute, or oblique obtuse orientation with respect to a lamellar length based on an angle of orientation recorded for the collagen fibrillar element;
(b) establishing a set of collagen fibrillar element orientation patterns for successive planes of focus throughout a thickness of the lamellar specimen, wherein for each plane of focus, a distribution of each category of collagen fibrillar element orientation is based on a percentage of each category of collagen fibril element orientation in a total number of collagen fibrillar elements that is observed for the plane of focus; and
(c) modeling the collagen fibrillar element orientation distributions for the planes of focus throughout the thickness of the lamellar specimen into a three-dimensional model of a bone structure.

* * * * *

UNITED STATES PATENT AND TRADEMARK OFFICE
CERTIFICATE OF CORRECTION

| | | |
|---|---|---|
| PATENT NO. | : 8,082,135 B2 | Page 1 of 1 |
| APPLICATION NO. | : 11/917281 | |
| DATED | : December 20, 2011 | |
| INVENTOR(S) | : Ascenzi | |

It is certified that error appears in the above-identified patent and that said Letters Patent is hereby corrected as shown below:

On the Title Page:

In the References Cited section, item (56), under the OTHER PUBLICATIONS subsection, page 2, first col., Line 8: please delete "Jouranl" and insert --Journal--.

In the References Cited section, item (56), under the OTHER PUBLICATIONS subsection, page 2, first col., Line 16: please delete "Jouranl" and insert --Journal--.

In the Claims:

Claim 4, Column 34, Line 66: please delete "specimen".

Claim 7, Column 35, Line 16: please delete "fibrils".

Claim 16, Column 36, Line 4: please delete "9" and insert --8--.

Signed and Sealed this
Fifteenth Day of May, 2012

David J. Kappos
*Director of the United States Patent and Trademark Office*